US010611313B2

(12) United States Patent
Westcott

(10) Patent No.: US 10,611,313 B2
(45) Date of Patent: Apr. 7, 2020

(54) ACCESSORY RACK FOR A VEHICLE

(71) Applicant: Westcott Designs Inc., Cave Creek, AZ (US)

(72) Inventor: Jeffrey Richard Westcott, Cave Creek, AZ (US)

(73) Assignee: Westcott Designs Inc., Cave Creek, AZ (US)

( * ) Notice: Subject to any disclaimer, the term of this patent is extended or adjusted under 35 U.S.C. 154(b) by 0 days.

(21) Appl. No.: 16/365,512

(22) Filed: Mar. 26, 2019

(65) Prior Publication Data

US 2020/0047680 A1 Feb. 13, 2020

Related U.S. Application Data

(60) Provisional application No. 62/715,657, filed on Aug. 7, 2018.

(51) Int. Cl.
*B60R 9/06* (2006.01)
*A47J 37/07* (2006.01)
*B60N 3/00* (2006.01)
*B62D 43/02* (2006.01)

(52) U.S. Cl.
CPC ............. *B60R 9/06* (2013.01); *A47J 37/0704* (2013.01); *A47J 37/0786* (2013.01); *B60N 3/008* (2013.01); *B62D 43/02* (2013.01)

(58) Field of Classification Search
CPC ......... B60R 9/06; B60R 9/10; Y10S 224/924; B60D 1/52; B62D 43/02
USPC .................................................. 224/502, 509
See application file for complete search history.

(56) References Cited

U.S. PATENT DOCUMENTS

| 4,282,994 | A | * | 8/1981 | Hilliard | .................. | B62D 43/02 |
|---|---|---|---|---|---|---|
| | | | | | | 224/42.15 |
| 5,094,373 | A | | 3/1992 | Lovci | | |
| 5,244,133 | A | | 9/1993 | Abbott et al. | | |
| 5,333,888 | A | | 8/1994 | Ball | | |

(Continued)

FOREIGN PATENT DOCUMENTS

| CN | 206406843 U | 8/2017 |
|---|---|---|
| DE | 202016105755 U1 | 2/2018 |
| EP | 1008491 B1 | 11/1999 |

OTHER PUBLICATIONS

Aluminess Products, Inc., Ford Econoline Van Rear Bumper for 2008-2014, https://www.aluminess.com/ford/ford-vans-2008-2013/rear-bumper/, Jan. 9, 2019, Aluminess Products, Inc., United States.

*Primary Examiner* — Corey N Skurdal
(74) *Attorney, Agent, or Firm* — Schmeiser, Olsen & Watts LLP

(57) ABSTRACT

An accessory rack for a vehicle couples to the hitch receiver of a vehicle to carry accessories on the vehicle. The accessory rack includes a base rack, a hitch coupling assembly, a first swing arm assembly and a second swing arm assembly. The first and second swing arm assemblies are hingedly and removably coupled to the base rack. The first and second swing arm assemblies swing out from the center of the base rack using hinges at the outer ends of the base rack. The first and second swing arm assemblies carry accessory racks for different types of accessories. The base rack is coupled to the hitch coupling assembly. The hitch coupling assembly couples the base rack and the first and second swing arm assemblies to the hitch receiver of the vehicle.

20 Claims, 13 Drawing Sheets

(56) References Cited

U.S. PATENT DOCUMENTS

| | | | |
|---|---|---|---|
| 5,423,566 A | 6/1995 | Warrington et al. | |
| 5,518,159 A * | 5/1996 | DeGuevara | B60R 9/06 224/488 |
| 5,538,168 A * | 7/1996 | Burger | B62D 43/02 224/42.21 |
| 5,685,686 A | 11/1997 | Burns | |
| 5,842,615 A * | 12/1998 | Goodness | B60R 9/06 224/509 |
| 5,884,826 A | 3/1999 | Shaver | |
| 6,105,989 A | 8/2000 | Linger | |
| 6,164,508 A * | 12/2000 | van Veenen | B60R 9/06 224/502 |
| 6,701,913 B1 | 3/2004 | LeDuc et al. | |
| 6,835,021 B1 | 12/2004 | McMillan | |
| 7,810,439 B2 * | 10/2010 | Bless | B60R 9/06 108/115 |
| 7,823,904 B2 | 11/2010 | Coy | |
| 9,421,836 B1 | 8/2016 | Ford et al. | |
| 9,586,450 B2 | 3/2017 | Ford | |
| 10,479,284 B1 * | 11/2019 | Salyer | B60R 9/06 |
| 2002/0171226 A1 | 11/2002 | McCoy et al. | |
| 2004/0150189 A1 | 8/2004 | Deanda | |
| 2006/0151555 A1 * | 7/2006 | Mills | B60R 9/06 224/509 |
| 2011/0278336 A1 * | 11/2011 | Landrum | B60R 9/06 224/509 |
| 2012/0292357 A1 * | 11/2012 | Tennyson | B60R 9/06 224/281 |
| 2015/0115010 A1 | 4/2015 | Ziola | |
| 2018/0265014 A1 | 9/2018 | Phillips | |

\* cited by examiner

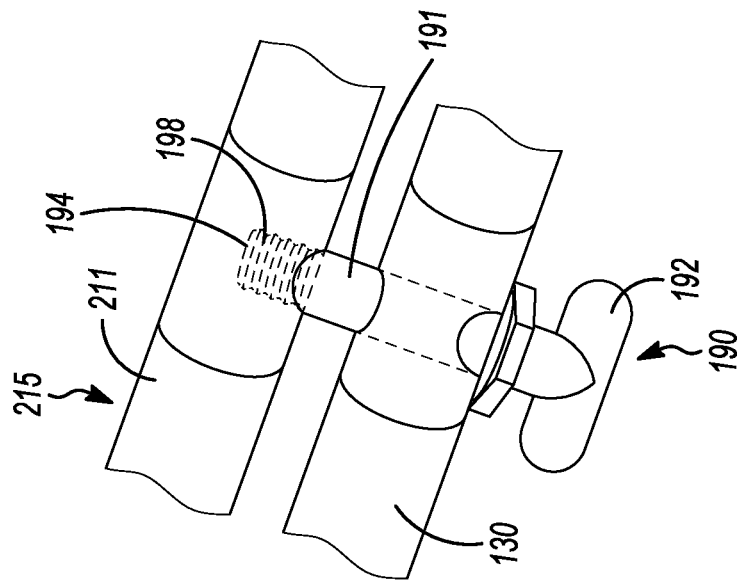
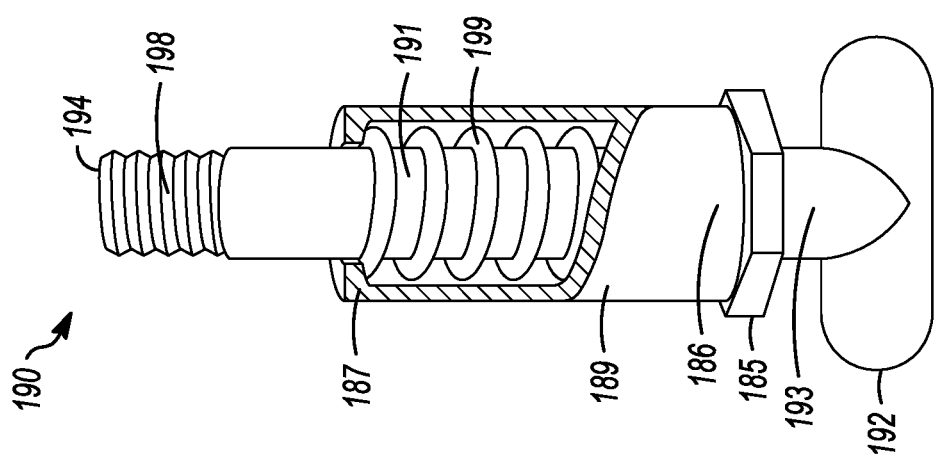
FIG. 13
FIG. 12

ACCESSORY RACK FOR A VEHICLE

CROSS REFERENCE TO RELATED APPLICATION

This invention claims priority to U.S. provisional patent application Ser. No. 62/715,657, filed Aug. 7, 2018 to Applicant Jeffrey Richard Westcott, and entitled "Tire Rack Assembly", which is incorporated entirely herein by reference.

BACKGROUND OF THE INVENTION

Technical Field

This invention relates to accessory racks for vehicles, and specifically to an accessory rack that couples to the hitch receiver of a vehicle.

State of the Art

Vehicle owners often mount accessories to the outside of their vehicles to store and transport items that they cannot or do not wish to carry inside the vehicle. It is often desirable to mount accessories on the rear side of a vehicle, especially trucks and sport utility vehicles. The accessory racks may be mounted to the rear bumper of a vehicle. However, this may put undesirable stress on the bumper. Modern bumpers are often not designed to handle the weight and stress of an accessory rack and accessories on the rack. Accordingly, what is needed is an accessory rack that is mounted to a rear side of a vehicle but does not couple to the bumper of the vehicle.

BRIEF DESCRIPTION OF THE DRAWINGS

FIG. 12 shows a partial cutaway side view of a locking pin of an accessory rack for a vehicle;

FIG. 13 illustrates how the locking pin of FIG. 12 locks a swing rod of the accessory rack in a stored position.

DETAILED DESCRIPTION OF EMBODIMENTS OF THE INVENTION

As discussed above, embodiments of the present invention relate to accessory racks for vehicles, and specifically to an accessory rack that couples to the hitch receiver of a vehicle. Accessory racks are commonly used on the exterior of vehicles to carry accessories. An accessory rack is often coupled to the bumper of a vehicle to carry spare tires, bicycles, spare fuel tanks, and other accessories. However, vehicle bumpers are often not designed to carry the weight of an accessory rack and the accessories mounted to it. Described herein is an accessory rack for a vehicle that is coupled to the hitch receiver of a vehicle, and not coupled to the bumper. The hitch receiver of a vehicle is designed to be sturdy and can carry the weight of an accessory rack and accessories.

The disclosed accessory rack is conveniently carried at the rear of a vehicle, with two swing arm assemblies that each carry accessories such as spare tires, spare fuel tanks, barbecues, coolers, and other accessories. The accessory rack includes a base rack, a hitch coupling assembly, and a first and a second swing arm assembly. The hitch coupling assembly couples the base rack to the hitch receiver of a vehicle. Each swing arm assembly is hingedly and removably coupled to the base rack. Each swing arm assembly is hinged to the base rack at the outer ends of the base rack. Each swing arm assembly swings out from the center, allowing easy access to the rear of the vehicle. Accessories are mounted side-by-side on the swing arm assemblies, which keeps the center of gravity low and minimizes blockage of the rear window of the vehicle. The swing arm assemblies are interchangeably, with different swing arm assemblies designed to hold different accessories. The accessory rack for a vehicle is easily installed and removed from the vehicle, and easily carries a variety of accessories.

Figure 1:
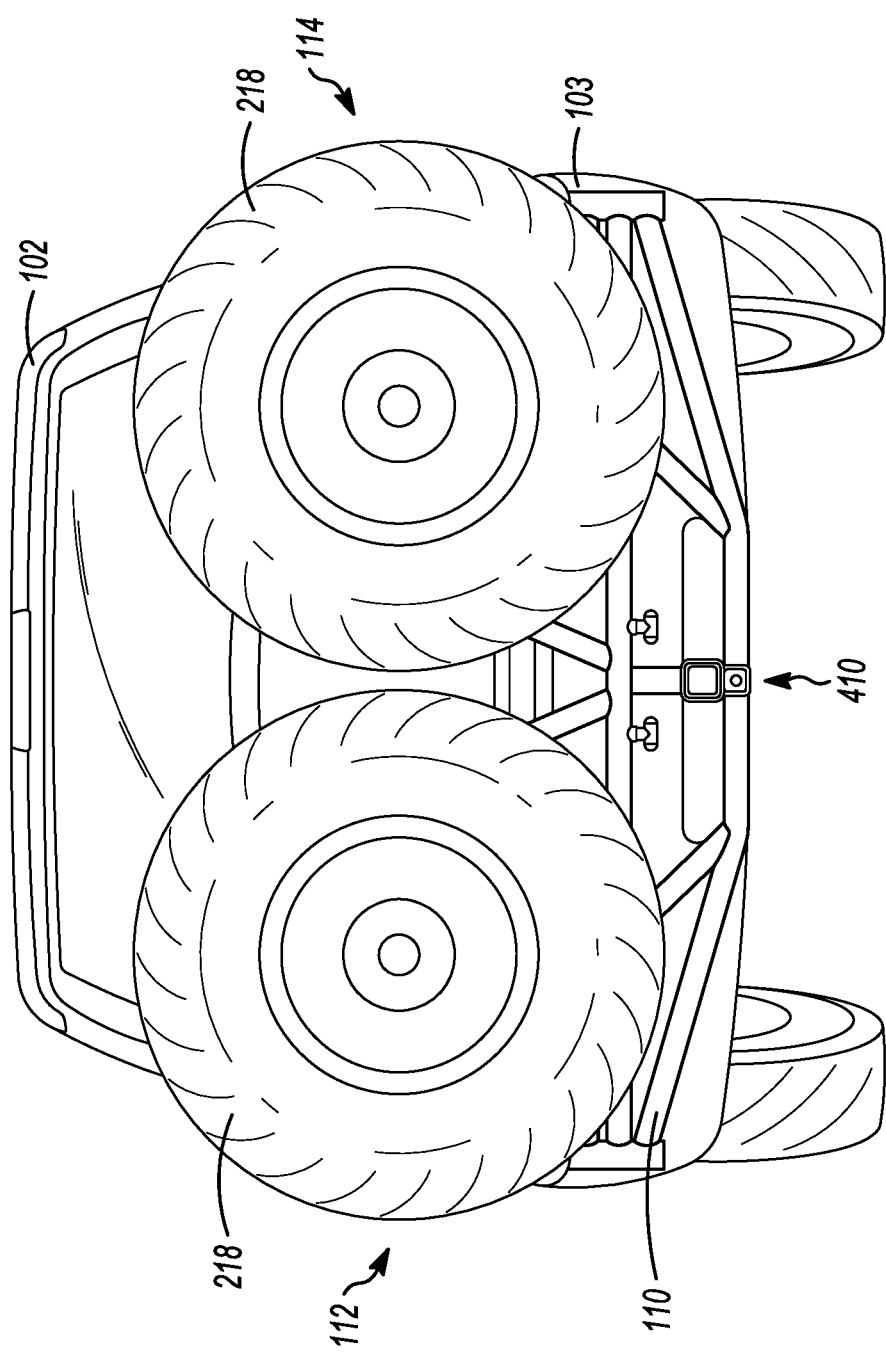
FIG. 1 shows a rear view of a vehicle with an accessory rack coupled to the hitch receiver of the vehicle.
Figure 2:
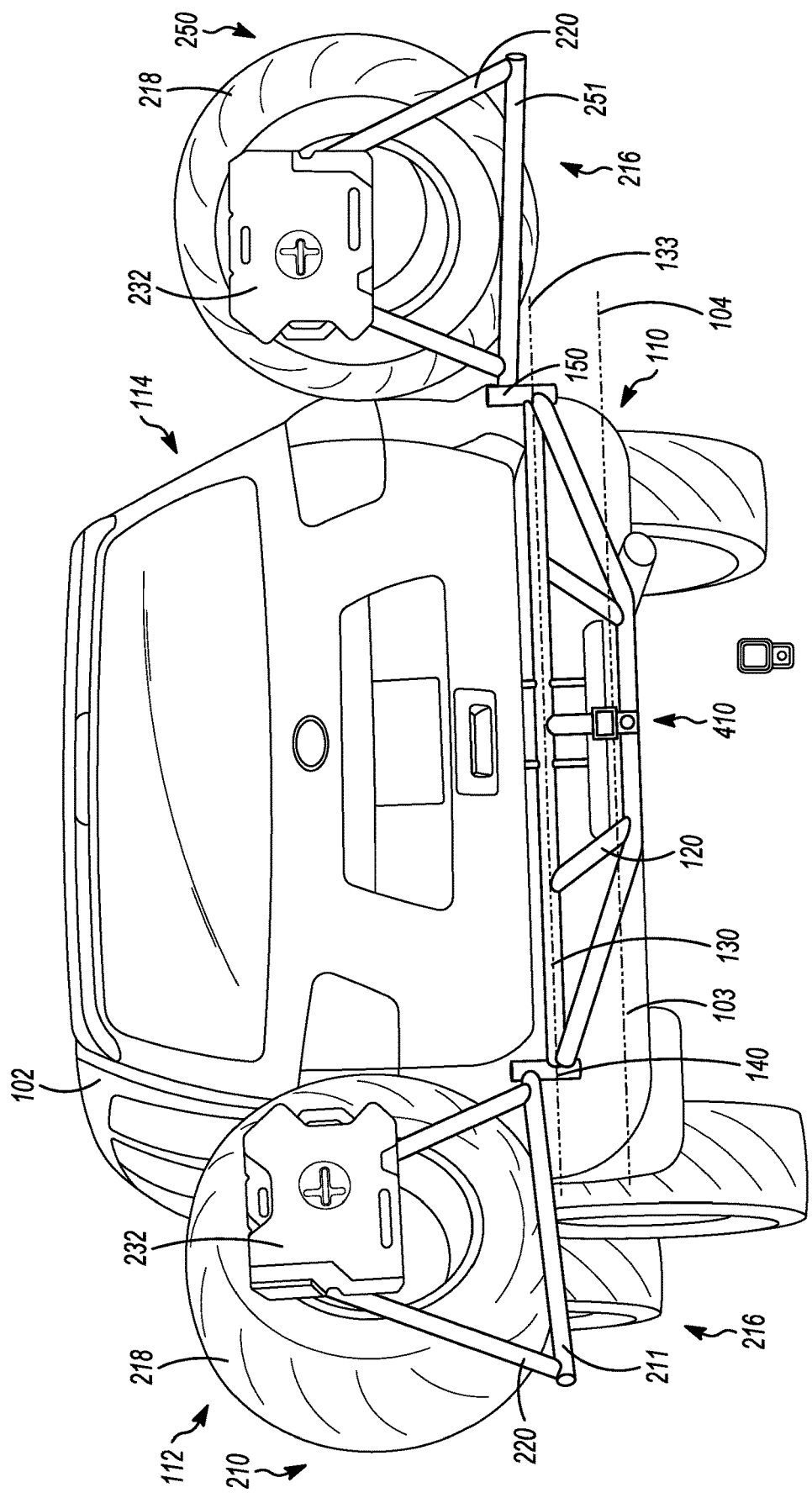
FIG. 2 shows the accessory rack coupled to the hitch receiver of the vehicle of FIG. 1, with a pair of swing arm assemblies of the accessory rack swung into an open position to allow access to the rear of the vehicle.
Figure 3:
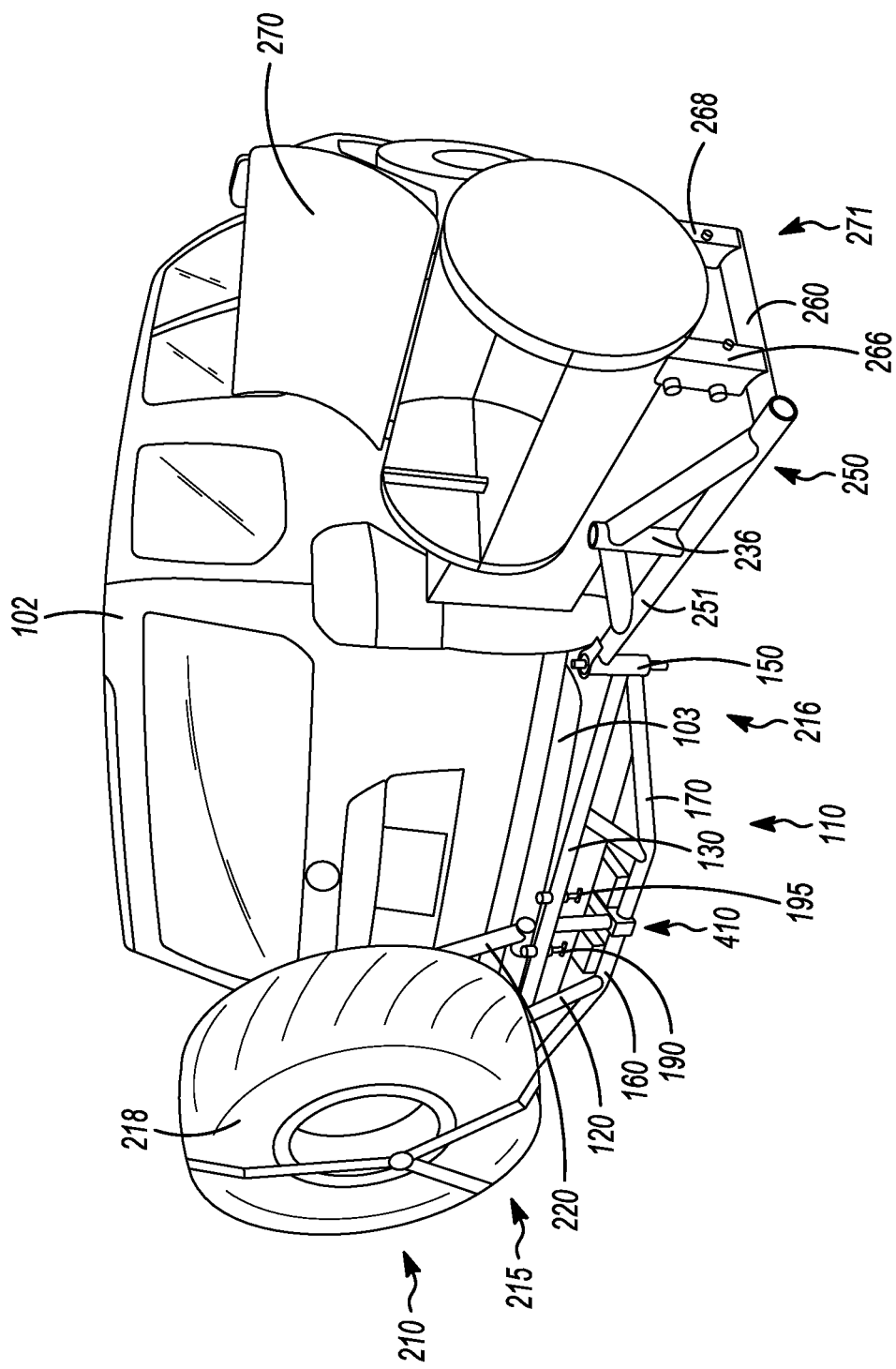
FIG. 3 shows an accessory rack coupled to a hitch receiver of a vehicle, with a first swing arm assembly of the accessory rack in a stored position and a second swing arm assembly of the accessory rack on an open position.

FIG. 1 through FIG. 3 shows an accessory rack 110 coupled to a vehicle 102 and carrying some example accessories. FIG. 1 shows accessory rack 110 coupled to vehicle 102, with accessory rack 110 carrying spare tire(s) 218. FIG. 2 shows accessory rack 110 carrying spare tires 218 and spare fuel tanks 232, with a first swing arm assembly 210 and a second swing arm assembly 250 in open position 216. FIG. 3 shows accessory rack 110 carrying a spare tire 218 and a barbecue 270, with first swing arm assembly 210 in a first swing arm assembly stored position 215 and second swing arm assembly 250 in open position 216. Accessory rack 110 is coupled to vehicle 102 using a hitch coupling assembly 410. Accessory rack 110 is coupled to hitch coupling assembly 410. Hitch coupling assembly 410 is coupled to hitch receiver 108 to couple accessory rack 110 to vehicle 102.

Figure 4:
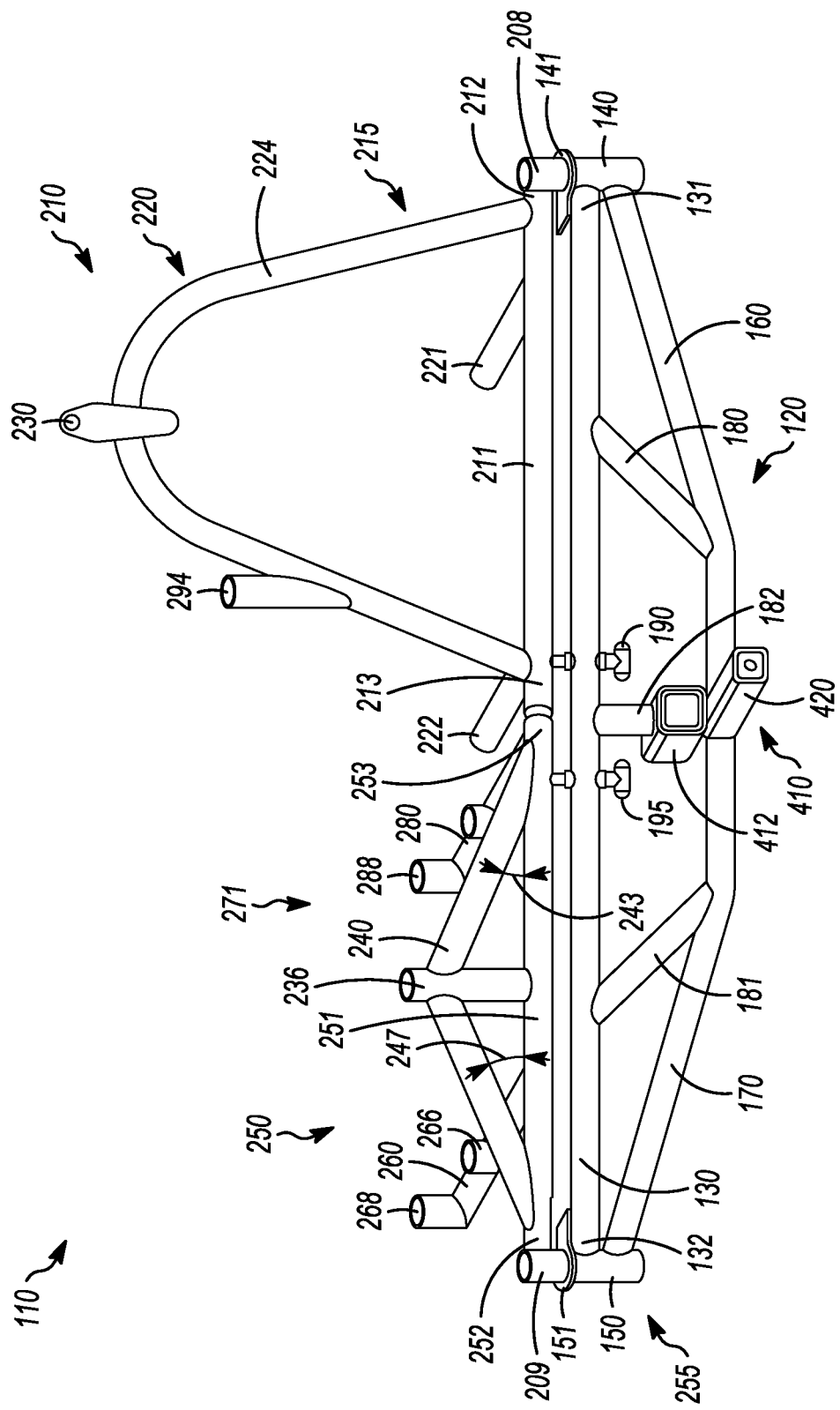
FIG. 4 shows a rear view of an accessory rack for a vehicle that has been removed from the vehicle.
Figure 5:
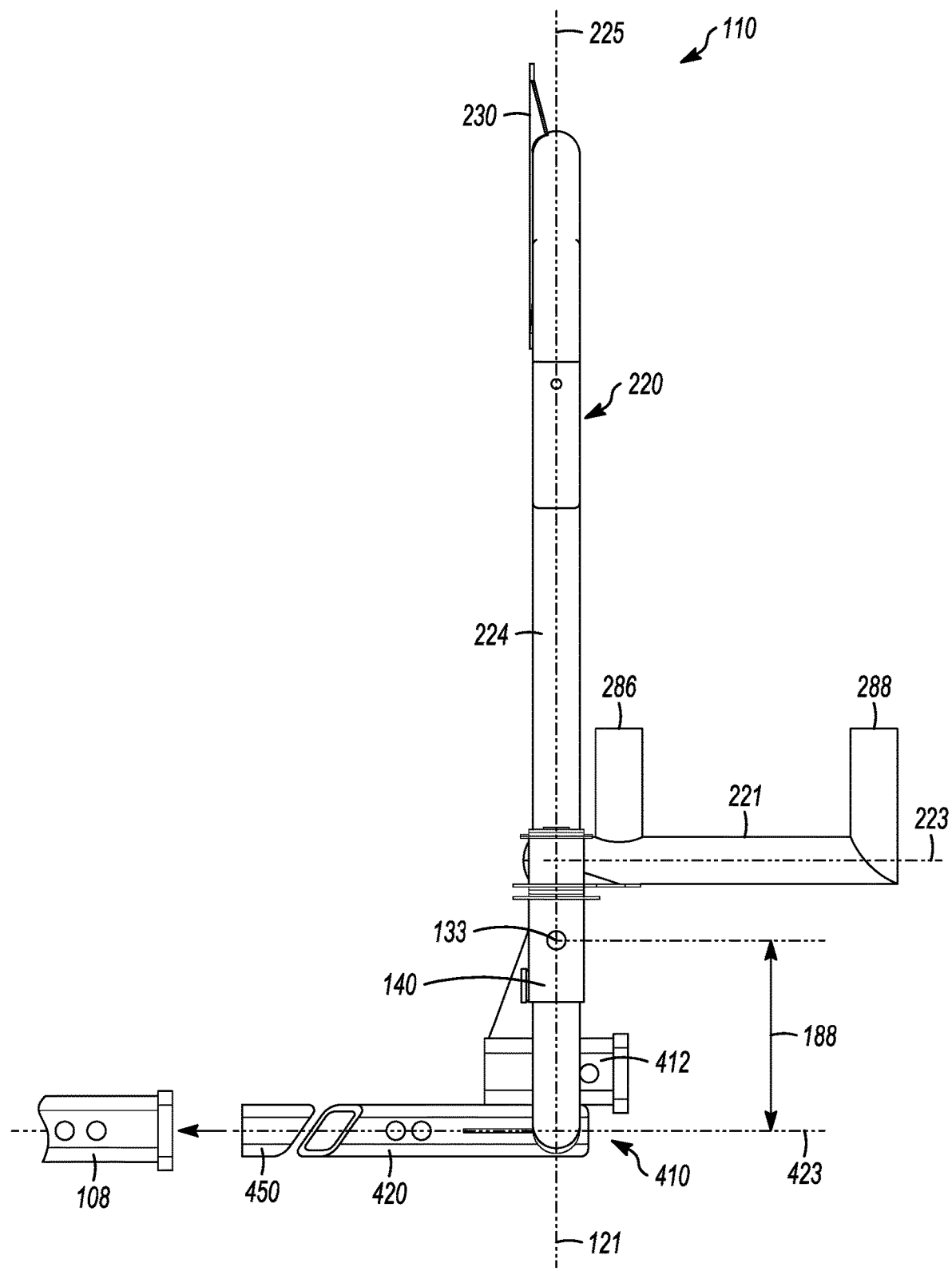
FIG. 5 shows a side view of the accessory rack for a vehicle of FIG. 4 being coupled to the hitch receiver of the vehicle.

FIG. 4 and FIG. 5 shows details of accessory rack 110. FIG. 4 shows a rear view of accessory rack 110 removed from vehicle 102. FIG. 5 shows a side view of accessory rack 110 being coupled to hitch receiver 108 of vehicle 102.

Accessory rack 110 includes a base rack 120, hitch coupling assembly 410, first swing arm assembly 210, and second swing arm assembly 250. Accessory rack 110 is coupled to hitch coupling assembly 410 as shown in FIG. 4 and FIG. 5. Hitch coupling assembly 410 (see FIG. 6 and accompanying description) is coupled to hitch receiver 108 of vehicle 102 to couple base rack 120 to vehicle 102, best seen in FIG. 5. First and second swing arm assemblies 210 and 250 are coupled to base rack 120. First and second swing arm assemblies 210 and 250 can be configured with a variety of racks to hold accessories. In the embodiment of accessory rack 110 shown in FIG. 1 and FIG. 2, first and second swing arm assemblies 210 and 250 both include a tire rack 220 that holds a spare tire 218 and a spare fuel tank 232. In the embodiment of accessory rack 110 shown in FIG. 3, FIG. 4, and FIG. 5, first swing arm assembly 210 includes tire rack 220 to hold spare tire 218, and second swing arm assembly 250 includes a barbecue mount 271 to hold a barbecue 270.

Figure 6:
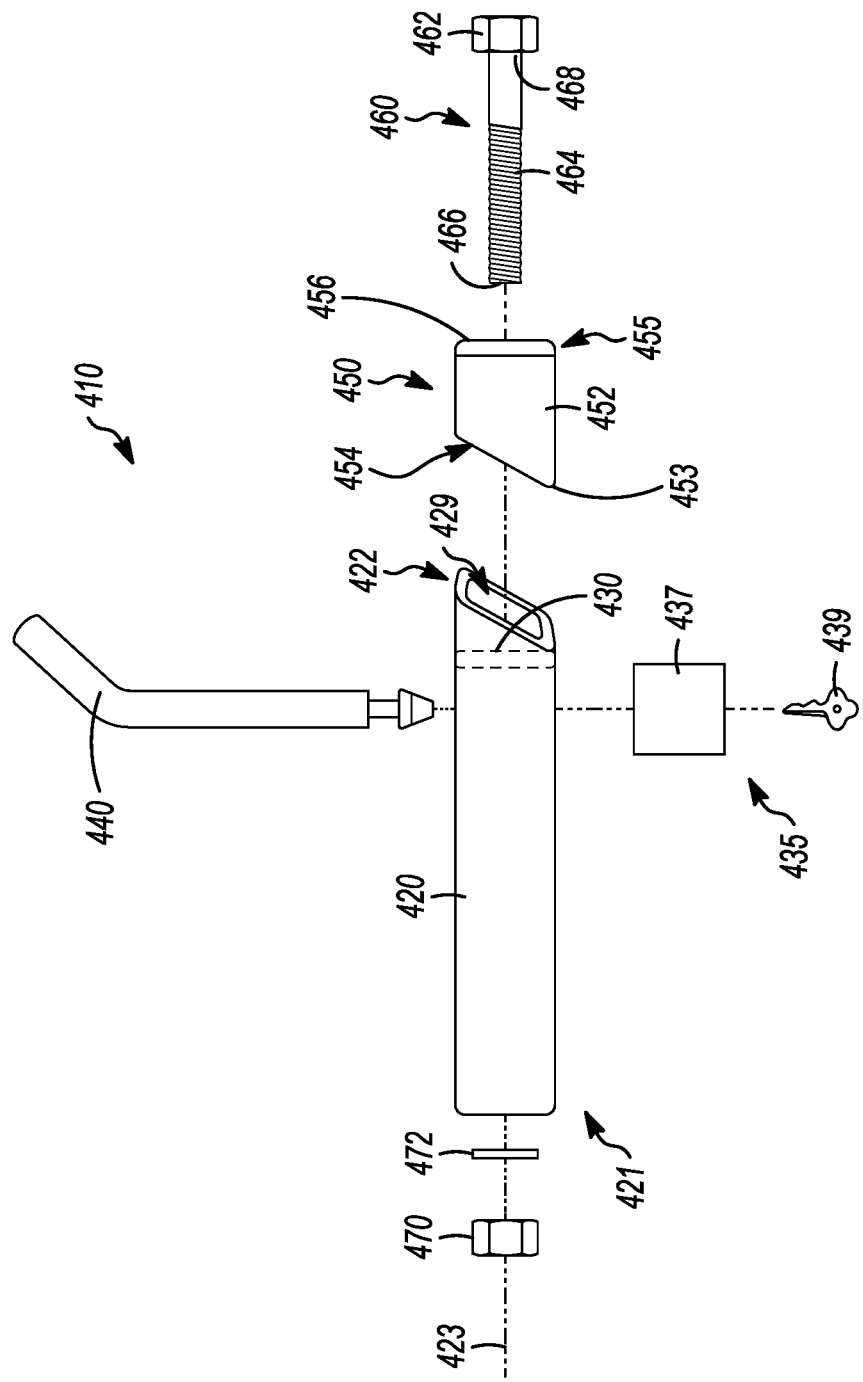
FIG. 6 shows an exploded view of a hitch coupling assembly that couples an accessory rack to the hitch receiver of a vehicle.

FIG. 6 shows details of hitch coupling assembly 410. FIG. 6 shows a top exploded view of hitch coupling assembly 410. Hitch coupling assembly 410 includes a receiver tube 420, a receiver wedge element 450 that is coupled to receiver tube 420, and a tightening bolt 460 and nut 470 that is used to couple receiver wedge element 450 to receiver tube 420. Hitch coupling assembly 410 also includes a receiver lock 435 that is used to lock receiver tube 420 and receiver wedge element 450 into hitch receiver 108.

Receiver tube 420 is an elongate hollow tube with a rounded rectangular shaped transverse cross section. Receiver tube 420 is shaped to fit snugly into hitch receiver 108 (see FIG. 5). Receiver tube 420 has a receiver tube first end 421, a receiver tube second end 422 opposing receiver tube first end 421, and a receiver tube longitudinal axis 423. Receiver tube 420 is hollow, with a first end opening at receiver tube first end 421, and a second end opening 429 into receiver tube second end 422.

Receiver tube 420 has a bulkhead 430 inside receiver tube 420, positioned between receiver tube first end 421 and receiver tube second end 422. Bulkhead 430 is a wall coupled to each of the four sides of receiver tube 420. Bulkhead 430 has a bulkhead hole through bulkhead 430, large enough for a threaded shaft 464 of tightening bolt 460 to pass through.

Receiver tube 420 has lock holes through two opposing side panels of receiver tube 420. The lock holes are to extend a receiver lock 435 through receiver tube 420 (and hitch receiver 108) and lock hitch coupling assembly 410 into hitch receiver 108.

Hitch coupling assembly 410 also includes receiver wedge element 450. Receiver wedge element 450 is coupled to receiver tube 420 with tightening bolt 460. Receiver wedge element 450 includes a receiver wedge tube 452 and an end cap 456. Receiver wedge tube 452 is a hollow tube with a rounded rectangular shaped transverse cross section. Receiver wedge tube 452 has a receiver wedge tube first end 453 and a receiver wedge tube second end 455 opposing receiver wedge tube first end 453. Receiver wedge tube first end 453 is open, having a receiver wedge tube first end opening 454 into receiver wedge tube first end 453. Receiver wedge tube second end 455 is also open but is covered by end cap 456. End cap 456 is coupled to receiver wedge tube second end 455. End cap 456 is sized and shaped to cover receiver wedge tube second end 455 and to capture a bolt head 462 of tightening bolt 460 in end cap 456 so that tightening bolt 460 cannot rotate.

A receiver wedge first end surface of receiver wedge first end 453 is parallel to a receiver tube second end surface of receiver tube 420. The receiver wedge first end surface is parallel to the receiver tube second end surface so that when receiver wedge element 450 is coupled to receiver tube 420, receiver wedge first end 453 mates with and slides along receiver tube second end 422. This sliding of receiver wedge element 450 with respect to receiver tube 420 tightens and frictionally couples receiver tube 420 and receiver wedge element 450 inside of hitch receiver tube 108, reducing up and down and side-to-side movement of hitch coupling assembly 410 in hitch receiver 108. This minimizes the movement of accessory rack 110 on vehicle 102.

End cap 456 is designed to cover receiver wedge tube second end 455 and capture a bolt head 462 of tightening bolt 460 so that bolt head 462 and tightening bolt 460 cannot turn. End cap 456 includes a cavity that is sized and shaped to fit bolt head 462 of tightening bolt 460. The cavity is inset into end cap 456. The cavity has an end cap hole through a cavity end wall that allows threaded shaft 464 through it, but not bolt head 462. The cavity has a cross-sectional shape that is designed to conform to a cross-section shape of bolt head 462 so that when bolt 460 is extended through end cap 456 with threaded shaft 464 extending out from receiver wedge tube first end 453 and bolt head 462 inset into the cavity, bolt head 462 is prevented from rotating.

Hitch coupling assembly 410 includes tightening bolt 460 and nut 470. Tightening bolt 460 and nut 470 couple receiver tube 420 and receiver wedge tube 452 of receiver wedge element 450 together before they are coupled to hitch receiver 108. Tightening bolt 460 has a threaded shaft 464 with a threaded shaft first end 466 and bolt head 462 at a threaded shaft second end 468. Receiver tube 420 and receiver wedge element 450 are two separate pieces so that they can slide against each other inside hitch receiver 108. When receiver wedge tube first end 453 slides along receiver tube second end 422 and they are inside hitch receiver 108, both receiver tube 420 and receiver wedge element 450 press against the inside surfaces of hitch receiver 108, frictionally coupling hitch coupling assembly 410 to hitch receiver 108 and mechanically stabilizing hitch coupling assembly 410 inside hitch receiver 108. Tightening bolt 460 is uses to tighten receiver wedge element 450 against receiver tube 420.

In order to use hitch coupling assembly 410 to couple accessory rack 110 to vehicle 102, accessory rack 110 is coupled to hitch coupling assembly 410. In the embodiment shown in the figures, accessory rack 110 is coupled to hitch coupling assembly 410 by coupling base rack 120 of accessory rack 110 to receiver tube 420, as shown in FIG. 4 and FIG. 5. In this embodiment, receiver tube 420 is coupled to a first and a second lower support rod 160 and 170 of base rack 120.

Receiver wedge element 450 can be coupled to receiver tube 420 either before or after accessory rack 110 is coupled to receiver tube 420. To couple receiver wedge element 450 to receiver tube 420, tightening bolt 460 is first inserted through receiver wedge element 450 by extending threaded shaft first end 466 of threaded shaft 464 through receiver wedge element 450 by going through receiver wedge tube second end 455 and out receiver wedge tube first end 453. Bolt head 462 does not fit through the end cap hole in the cavity but does fit inside the cavity. Threaded shaft first end 466 is inserted into receiver tube 420 through receiver tube second end opening 429, as shown in FIG. 6. Threaded shaft first end 466 is extended through the bulkhead hole. Nut 470, and in this embodiment, a washer 472, is threaded onto threaded shaft first end 466 of threaded shaft 464 by putting nut 470 and washer 472 through receiver tube first end 421. A socket wrench can be used to tighten nut 470 on threaded shaft 464 of tightening bolt 460 by extending the socket wrench through receiver tube first end 421. Once nut 470 is threaded onto tightening bolt 460, receiver wedge element 450 is coupled to receiver tube 420.

Hitch coupling receiver 410 is coupled to hitch receiver 108 by inserting receiver wedge element 450 and receiver tube 420, which is loosely coupled to receiver wedge element 450, into hitch receiver 108, as shown in FIG. 5. Inserting receiver tube 420 and receiver wedge element 450 into hitch receiver 108 of vehicle 102 couples hitch coupling assembly 410 and accessory rack 110 to vehicle 102. Hitch coupling assembly 410 is tightened inside of hitch receiver 108 by turning nut 470 on threaded shaft 464 of tightening bolt 460 to compress receiver wedge element 450 against receiver tube 420. Nut 470 can be tightened by extending a socket wrench through receiver tube first end 421. Pressing receiver wedge element 450 against receiver tube 420 by tightening nut 470 causes receiver wedge element 450 and receiver tube 420 to both press against the inside surfaces of hitch receiver 108, which frictionally couples receiver tube 420 and receiver wedge element 450 inside hitch receiver 108. At this point, hitch coupling assembly 410 and accessory rack 110 are coupled to hitch receiver 108 and vehicle 102.

Receiver lock 435 can be inserted through holes in the side of receiver tube 420 (and corresponding holes through hitch receiver 108) to lock hitch coupling assembly 410 in hitch receiver 108. Receiver lock 435 (FIG. 6) includes a receiver lock pin 440 that can be mechanically locked into a receiver lock box 437 using a key 439. Receiver lock 435 locks hitch coupling assembly 410 in hitch receiver 108 by extending receiver lock pin 440 through a first side hole in hitch receiver 108, through a first lock hole in a first side of receiver tube 420, through a second lock hole in a second side of receiver tube 420, and through a second side hole in hitch receiver 108. Receiver lock box 437 is then locked onto one end of receiver lock pin 440 using key 439. Receiver lock box 435 keeps receiver lock pin 440 from being removed from hitch receiver 108 and hitch coupling assembly 410 from one end, and a bend in receiver lock pin 440 keeps receiver lock pin 440 from being removed from the other end.

Hitch coupling assembly 410 also includes an accessory trailer hitch receiver 412, as shown in FIG. 4 and FIG. 5. Accessory trailer hitch receiver 412 is coupled to receiver tube 420 in this embodiment, but this is not meant to be limiting. Accessory trailer hitch receiver 412 is used when hitch coupling assembly 410 and accessory rack 110 is installed in hitch receiver 108, and it is also desired that vehicle 102 be equipped to pull a trailer. Accessory trailer hitch receiver 412 can be used to pull a trailer with vehicle 102 when hitch coupling assembly 410 is coupled to vehicle 102 using hitch receiver 108 on vehicle 102.

Figure 7:
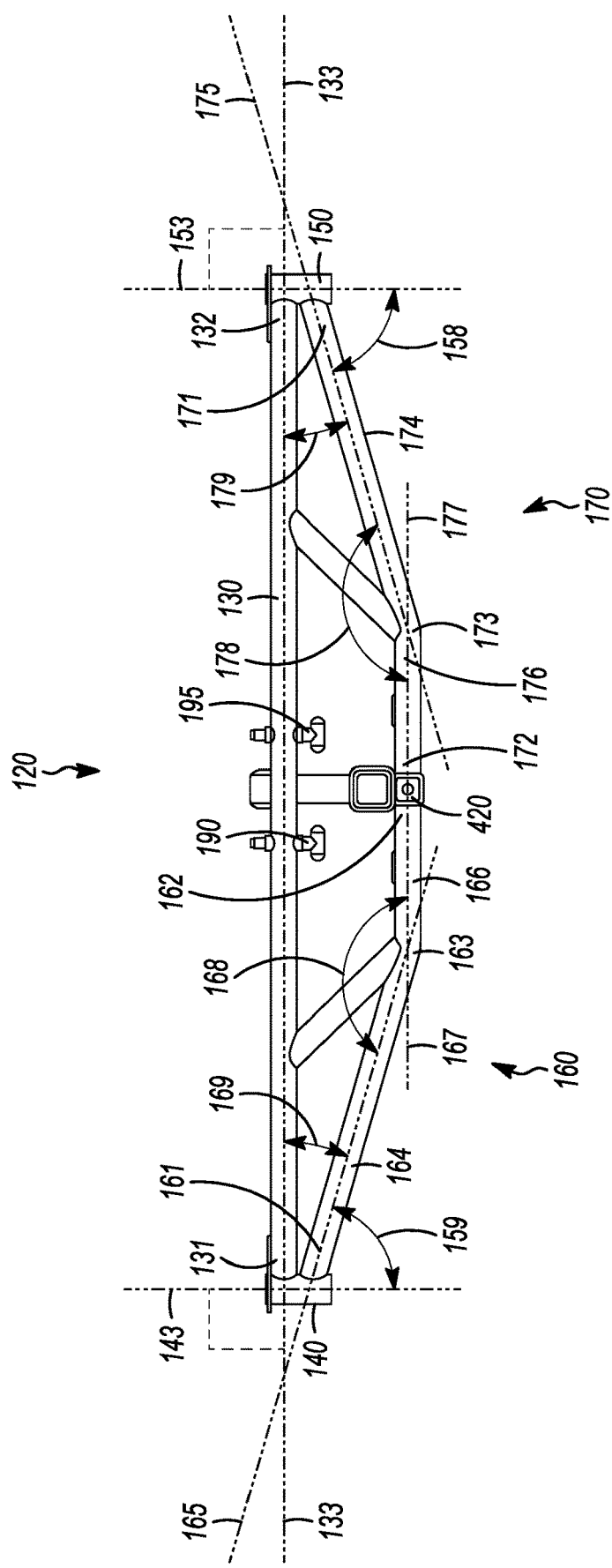
FIG. 7 shows a front view of a base rack of an accessory rack for a vehicle.
Figure 8:
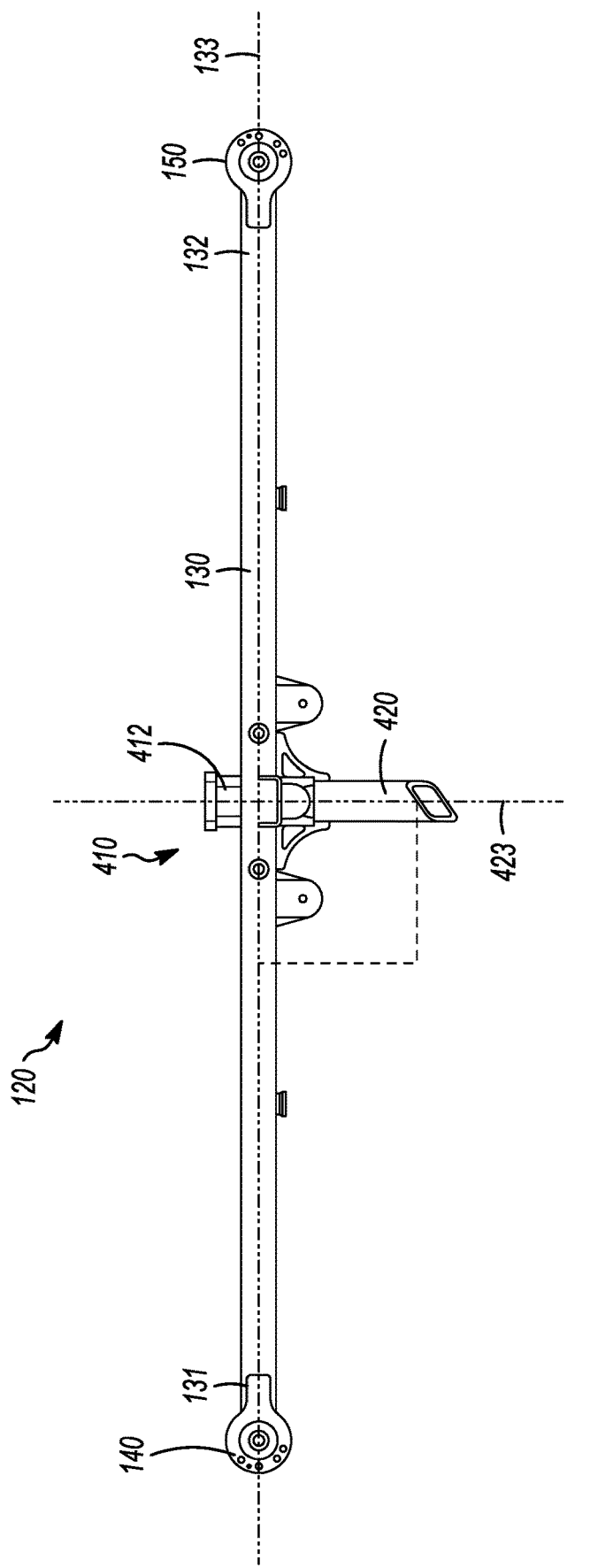
FIG. 8 shows a top view of the base rack of FIG. 7.
Figure 9:
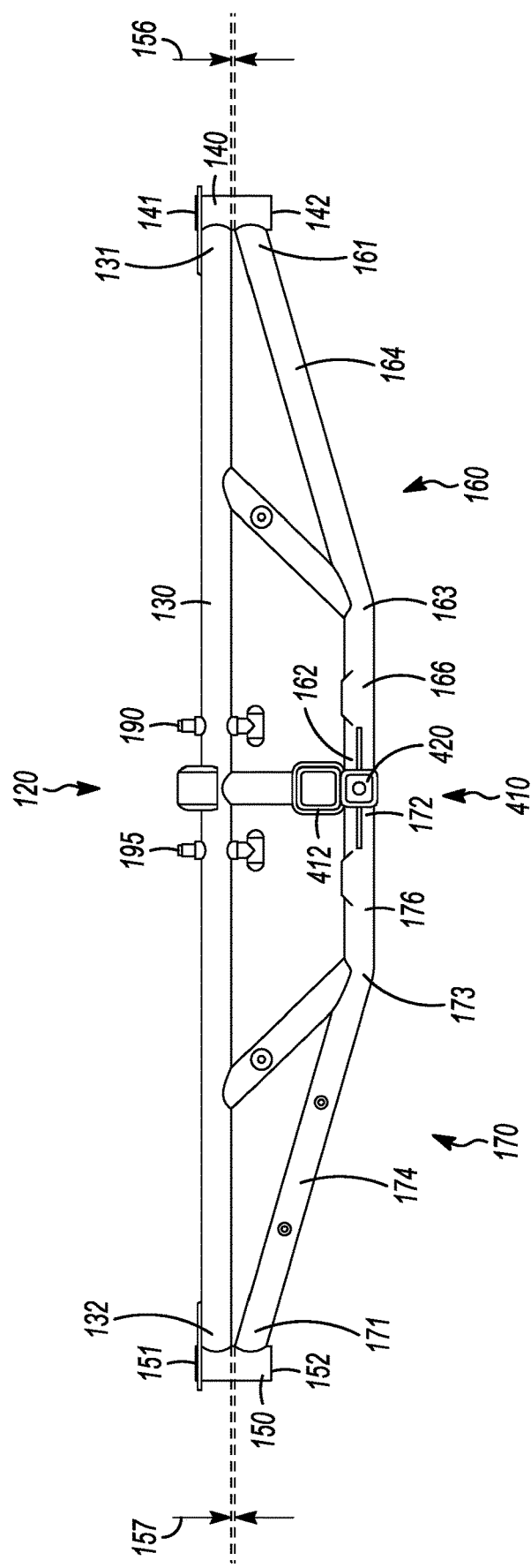
FIG. 9 shows a rear view of the base rack of FIG. 7.

FIG. 7, FIG. 8, and FIG. 9 provide further details of base rack 120. FIG. 7 shows a front view of base rack 120. FIG. 8 shows a top view of base rack 120. FIG. 9 shows a rear view of base rack 120. Base rack 120 includes an upper support rod 130, a first hinge tube 140, a second hinge tube 150, a first lower support rod 160, and a second lower support rod 170, as shown in FIG. 4, FIG. 5, FIG. 7, FIG. 8, and FIG. 9.

Upper support rod 130 is an elongate rod formed of rigid material, metal in this embodiment. The term "rod" in this document refers to any elongate rigid structure such as, but not limited to, a bar, tube, or pipe. In the embodiments shown in the figures, upper support rod 130 is a straight elongate hollow tube. Upper support rod 130 has an upper support rod first end 131, an upper support rod second end 132 opposing upper support rod first end 131, and an upper rod longitudinal axis 133. Upper rod longitudinal axis 133 is parallel to a bumper longitudinal axis 104 of a bumper 103 on vehicle 102, see FIG. 2. Upper rod longitudinal axis 133 is perpendicular to receiver tube longitudinal axis 423, once base rack 120 is coupled to hitch receiver 410, see FIG. 5. Receiver tube longitudinal axis 423 is perpendicular to upper rod longitudinal axis 133, and spaced apart from upper rod longitudinal axis 133 a hitch distance 188, as shown in FIG. 5. Hitch distance 188 is 8¼ inches in the embodiment shown in the figures. This distance has been shown to provide a stable accessory rack 110 once coupled to vehicle 102, and good ground clearance for accessory rack 110. In some embodiments, hitch distance 188 is between about 6 inches and about 10 inches. In some embodiments, hitch distance 188 is between about 4 inches and about 12 inches. These ranges provide good ground clearance and sturdy mounting of accessory rack 110 to vehicle 102.

First hinge tube 140 is coupled to upper support rod first end 131. First hinge tube 140 is a straight elongate tube in this embodiment. First hinge tube 140 has a first hinge tube first end 141, a first hinge tube second end 142 (FIG. 9), and a first hinge tube longitudinal axis 143 (FIG. 7). First hinge tube longitudinal axis 143 is perpendicular to upper rod longitudinal axis 133. First hinge tube 140 is used to couple first swing arm assembly 210 to base rack 120, and becomes part of a hinge 208 (FIG. 4) that hingedly couples first swing arm assembly 210 to base rack 120.

Second hinge tube 150 is coupled to upper support rod second end 132. Second hinge tube 150 is a straight elongate tube in this embodiment. Second hinge tube 150 has a second hinge tube first end 151, a second hinge tube second end 152, and a second hinge tube longitudinal axis 153 (FIG. 7). Second hinge tube longitudinal axis 153 is perpendicular to upper rod longitudinal axis 133. Second hinge tube 150 is used to couple second swing arm assembly 250 to base rack 120, and becomes part of a hinge 209 (FIG. 4) that hingedly couples first swing arm assembly 250 to base rack 120.

Base rack 120 also includes a first lower support rod 160 and a second lower support rod 170, best seen in FIG. 4, FIG. 7, and FIG. 9. First and second lower support rods 160 and 170 provide the lower connection between first and second hinge tubes 140 and 150. Hitch coupling assembly 410 is coupled to base rack 120 by being coupled to first and second lower support rods 160 and 170. In some embodiments, first and second lower support rods 160 and 170 are welded to hitch coupling assembly 410.

First lower support rod 160 extends between first hinge tube 140 and receiver tube 420 of hitch coupling assembly 410, see FIG. 4, FIG. 7, and FIG. 9. First lower support rod 160 extends from hitch coupling assembly 410 towards a vehicle driver's side 112 (FIG. 1) of vehicle 102 when accessory rack 110 is coupled to vehicle 102. First lower support rod 160 has a first lower rod first end 161, a first lower rod second end 162 opposing first lower rod first end 161, and a first lower rod bend 163 between first lower rod first end 161 and first lower rod second end 162. First lower rod bend 163 is a bend in first lower support rod 160 that allows for greater ground clearance at the outer ends of base rack 120 than in the middle at hitch coupling assembly 410. First lower rod second end 162 is coupled to receiver tube 420 of hitch coupling assembly 410.

First lower rod first end 161 is coupled to first hinge tube 140 between upper rod first end 131 of upper support rod 130 and first hinge tube second end 142. First lower rod first end 161 is coupled to first hinge tube 130 a first end distance 156 (FIG. 9) away from upper rod first end 131. First end distance 156 is 0.2 inches in the embodiment shown in the figures. First end distance 156 is between 0.1 to about 2 inches in some embodiments. This distance has been shown to provide maximum ground clearance at either end of base rack 120, minimal interference with vehicle tailgates, and good structural stability of base rack 120. In some embodiments, first end distance 156 is between 0 and about 4 inches.

First lower support rod 160 includes a first lower rod angle section 164 and a first lower rod parallel section 166, see FIG. 7 and FIG. 9. First lower rod angle section 164 extends from first lower rod first end 161 to first lower rod bend 163. First lower rod angle section 164 has a first lower rod angle section longitudinal axis 165 that extends from first lower rod first end 161 to first lower rod bend 163. A first lower rod angle 159 (FIG. 7) is formed between first lower rod angle section longitudinal axis 165 and first hinge tube longitudinal axis 143. First lower rod angle 159 is an acute angle so that hitch distance 188 is larger than first end distance 156. In the embodiment shown in the figures, first lower rod angle 159 is about 73 degrees. This angular value has been determined to provide structural stability of base rack 120 and good ground clearance at either end of base rack 120 when mounted on vehicle 102. In some embodiments, first lower rod angle 159 is between about 60 degrees and about 78 degrees. A first upper rod angle 169 is formed between first lower rod angle section longitudinal axis 165 and upper rod longitudinal axis 133. First upper rod angle 169 has a value of about 16 degrees in the embodiment shown in the figures. In some embodiments, first upper rod angle 169 has a value between about 14 and about 20 degrees. In some embodiments, first upper rod angle 169 has a value between about 10 and about 30 degrees.

First lower rod parallel section 166 extends from first lower rod bend 163 to first lower rod second end 162. First lower rod parallel section 166 has a first lower rod parallel section longitudinal axis 167 (FIG. 7) extending from first lower rod bend 163 to first lower rod second end 162. First lower rod parallel section longitudinal axis 167 is parallel to upper rod longitudinal axis 133, and bumper longitudinal axis 104 (FIG. 2), when accessory rack 110 is coupled to vehicle 102.

First lower rod bend 163 forms a first lower rod inner angle 168 between first lower rod angle section 164 and first lower rod parallel section 166 (between first lower rod angle section longitudinal axis 165 and first lower rod parallel section longitudinal axis 167). First lower rod inner angle 168 is about 164 degrees in the embodiment shown. This value for first lower rod inner angle 168 has been determined to provide a larger ground clearance below first hinge 140 of accessory rack 110 than the ground clearance below hitch coupling assembly 410 in the middle of accessory rack 110, without raising the accessories too far off the ground or blocking the view out the rear window of the vehicle. This larger ground clearance at the sides of accessory rack 110 allows vehicle 102 to easily drive over rocks, bumps, and other obstacles. In some embodiments, first lower rod inner angle 168 is between about 160 and about 168 degrees. In some embodiments, first lower rod inner angle 168 is between about 150 degrees and about 170 degrees.

Second lower support rod 170 extends between second hinge tube 150 and receiver tube 420 of hitch coupling assembly 410, see FIG. 4, FIG. 7, and FIG. 9. Second lower support rod 170 extends from hitch coupling assembly 410 towards a vehicle passenger side 114 (FIG. 1) of vehicle 102 when accessory rack 110 is coupled to vehicle 102. Second lower support rod 170 has a second lower rod first end 171, a second lower rod second end 172 opposing second lower rod first end 171, and a second lower rod bend 173 between second lower rod first end 171 and second lower rod second end 172. Second lower rod bend 173 is a bend in second lower support rod 170 that allows for greater ground clearance at the outer ends of base rack 120 than in the middle at hitch coupling assembly 410. Second lower rod second end 172 is coupled to receiver tube 420 of hitch coupling assembly 410.

Second lower rod first end 171 is coupled to second hinge tube 150 between upper rod second end 132 of upper support rod 130 and second hinge tube second end 152. Second lower rod first end 171 is coupled to second hinge tube 140 a second end distance 157 (FIG. 9) away from upper rod second end 132. Second end distance 157 is 0.2 inches in the embodiment shown in the figures. Second end distance 157 is between about 0.1 to about 2 inches in some embodiments. This distance has been shown to provide maximum ground clearance at either end of base rack 120, minimal interference with vehicle tailgates, and good structural stability of base rack 120. In some embodiments, second end distance 157 is between 0 and about 4 inches.

Second lower support rod 170 includes a second lower rod angle section 174 and a second lower rod parallel section 176, see FIG. 7 and FIG. 9. Second lower rod angle section 174 extends from second lower rod first end 171 to second lower rod bend 173. Second lower rod angle section 174 has a second lower rod angle section longitudinal axis 175 that extends from second lower rod first end 171 to second lower rod bend 173. A second lower rod angle 158 (FIG. 7) is formed between second lower rod angle section longitudinal axis 175 and second hinge tube longitudinal axis 153. Second lower rod angle 158 is an acute angle so that hitch distance 188 is larger than second end distance 156. In the embodiment shown in the figures, second lower rod angle 158 is about 73 degrees. This angular value has been determined to provide structural stability of base rack 120 and good ground clearance at either end of base rack 120 when mounted on vehicle 102. In some embodiments, second lower rod angle 158 is between about 60 degrees and about 78 degrees. A second upper rod angle 179 is formed between second lower rod angle section longitudinal axis 175 and upper rod longitudinal axis 133. Second upper rod angle 179 has a value of about 16 degrees in the embodiment shown in the figures. In some embodiments, second upper rod angle 179 has a value between about 14 and about 20 degrees. In some embodiments, second upper rod angle 179 has a value between about 10 and about 30 degrees.

Second lower rod parallel section 176 extends from second lower rod bend 173 to second lower rod second end 172. Second lower rod parallel section 176 has a second lower rod parallel section longitudinal axis 177 (FIG. 7) extending from second lower rod bend 173 to second lower rod second end 172. Second lower rod parallel section longitudinal axis 177 is parallel to upper rod longitudinal axis 133, and bumper longitudinal axis 104, when accessory rack 110 is coupled to vehicle 102. Second lower rod parallel section longitudinal axis 177 is parallel to first lower rod parallel section longitudinal axis 167. In the embodiment shown in the figures, second lower rod parallel section longitudinal axis 177 is colinear with first lower rod parallel section longitudinal axis 167, but this is not meant to be limiting.

Second lower rod bend 173 forms a second lower rod inner angle 178 between second lower rod angle section 174 and second lower rod parallel section 176. Second lower rod inner angle 178 is about 164 degrees, in the embodiment shown. This value for second lower rod inner angle 178 has been determined to provide a larger ground clearance below second hinge 150 of accessory rack 110 than the ground clearance below hitch coupling assembly 410 in the middle of accessory rack 110, without raising the accessories too far off the ground or blocking the view out the rear window of the vehicle. This larger ground clearance at the sides of accessory rack 110 allows vehicle 102 to easily drive over rocks, bumps, and other obstacles. In some embodiments, second lower rod inner angle 178 is between about 160 and about 168 degrees. In some embodiments, second lower rod inner angle 178 is between about 150 degrees and about 170 degrees.

Base rack 120 lies in a base rack plane 121, see FIG. 5. Upper rod longitudinal axis 133, first and second hinge tube longitudinal axes 143 and 153, first and second lower rod angle section longitudinal axes 165 and 175, and first and second lower rod parallel section longitudinal axes 167 and 177 all lie in base rack plane 121. In the embodiment shown in the figures, receiver tube longitudinal axis 423 is perpendicular to base rack plane 121, but this is not meant to be limiting. In some embodiments, receiver tube longitudinal axis 423 is not perpendicular to base rack plane 121.

Base rack 120, in the embodiment shown in the figures, includes several additional rods or bars to add structural support to base rack 120, see FIG. 4. Base rack 120 includes a first base rack angle support bar 180, a second base rack angle support bar 181, and a base rack vertical bar 182. First base rack angle support bar 180 extends between, and couples to, first lower support rod 160 and upper support rod 130. In the embodiment shown in the figures, first base rack angle support bar 180 extends between, and couples to, first lower rod bend 163 and upper support rod 130, but this is not meant to be limiting. Second base rack angle support bar 181 extends between, and couples to, second lower support rod 170 and upper support rod 130. In the embodiment shown in the figures, second base rack angle support bar 181 extends between, and couples to, second lower rod bend 173 and upper support rod 130, but this is not meant to be limiting.

Base rack vertical bar 182 extends between, and couples to, hitch coupling assembly 410 and upper support rod 130. In the embodiment shown in the figures, base rack vertical bar 182 is coupled to upper support rod 130 at one end, and to accessory trailer hitch receiver 412 of hitch coupling assembly 410 at the other end. In embodiments where hitch coupling assembly 410 does not include accessory trailer hitch receiver 412, base rack vertical bar 182 is coupled to upper support rod 130 at one end, and to receiver tube 420 at the other end.

Figure 10:
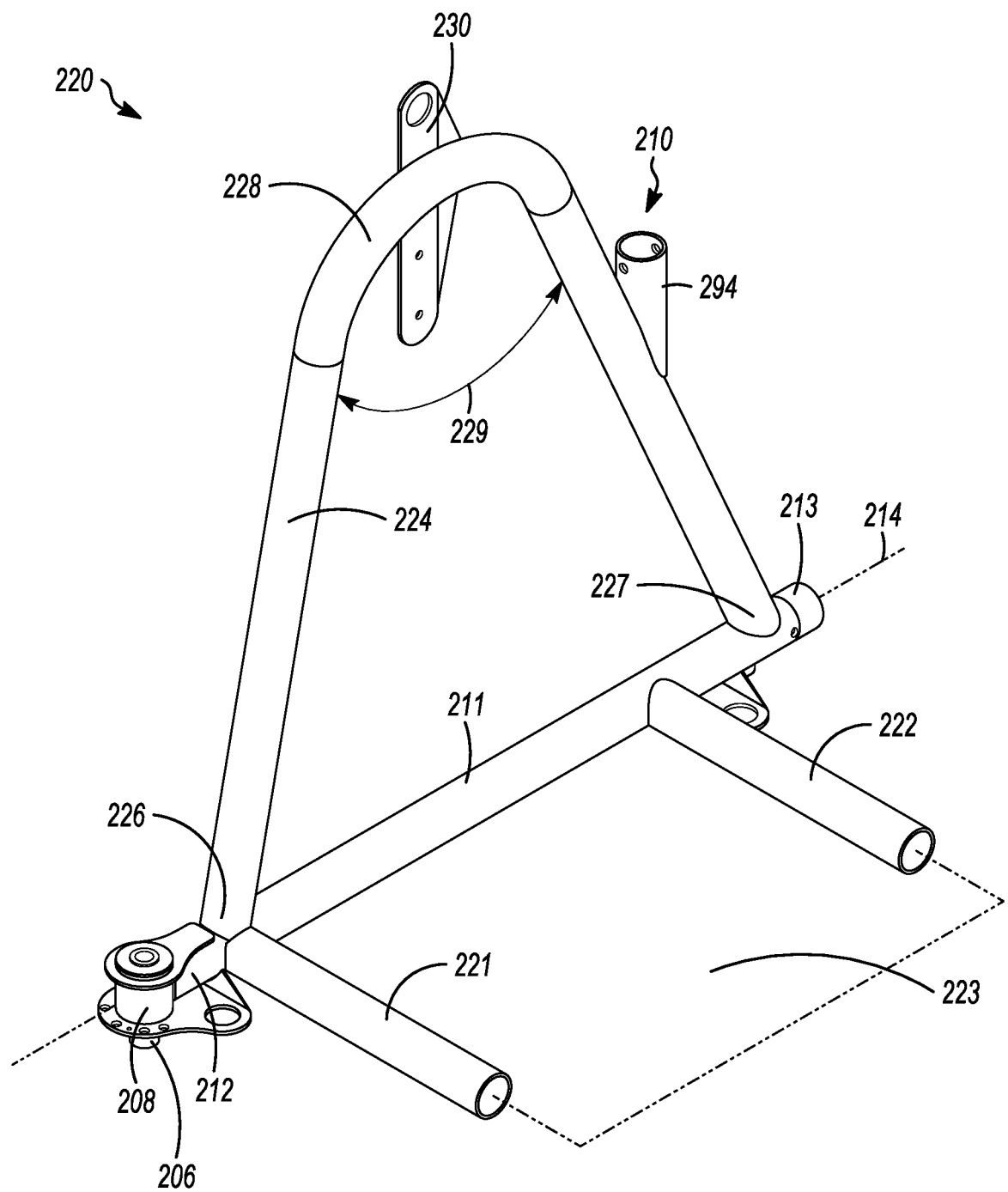
FIG. 10 shows a front perspective view of a swing arm assembly for an accessory rack for a vehicle, that includes a tire rack.
Figure 11:
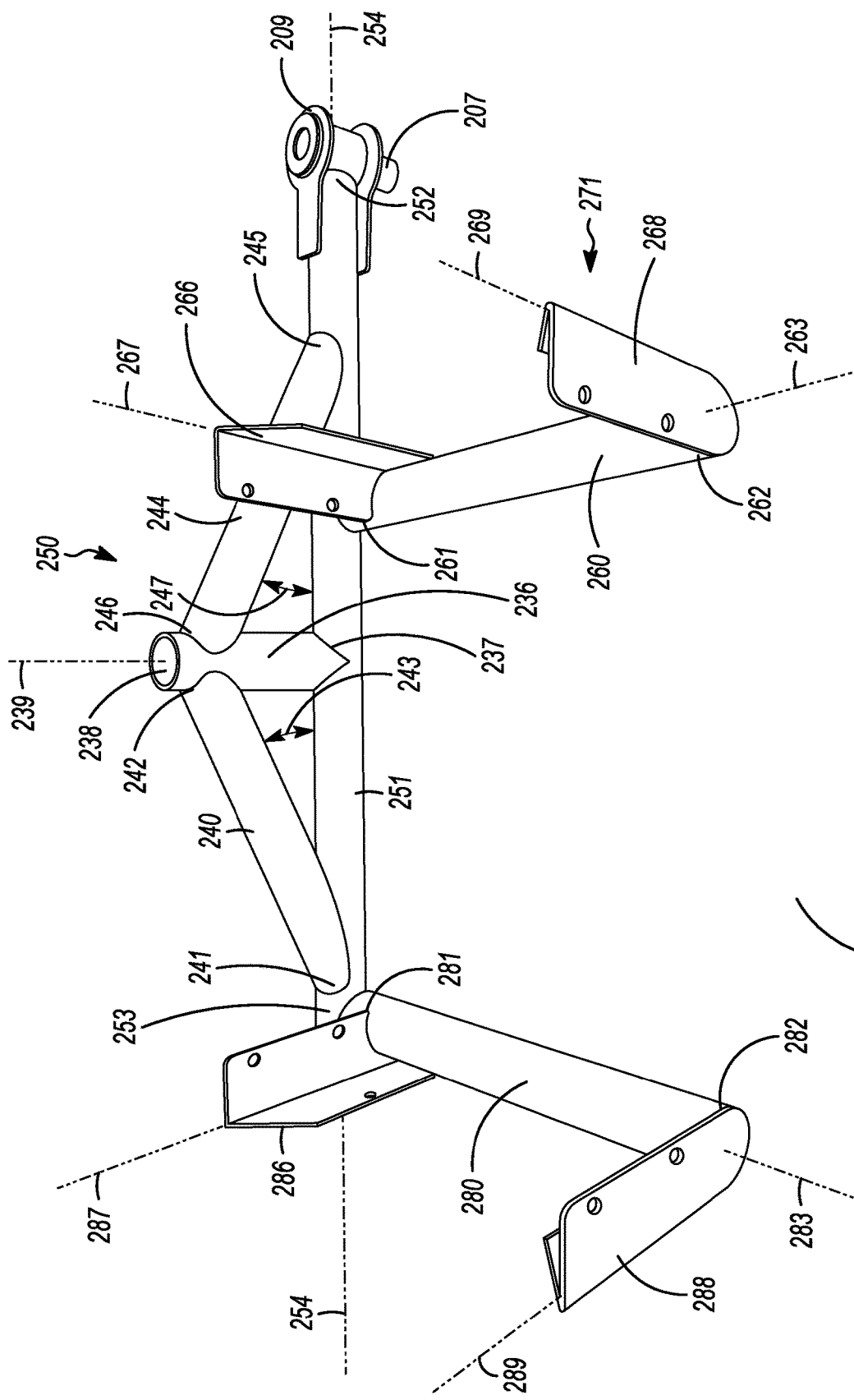
FIG. 11 shows a front perspective view of a swing arm assembly for an accessory rack for a vehicle, that includes a BBQ rack.

Accessory rack 110 includes first and second swing arm assemblies 210 and 250, see FIG. 1 through FIG. 4. First and second swing arm assemblies 210 and 250 are both removably and hingedly coupled to base rack 120. First and second swing arm assemblies 210 and 250 are each meant to carry different accessory mounts. FIG. 4 shows a rear view of accessory rack 110 with first swing arm assembly 210 and second swing arm assembly 250 coupled to base rack 120. FIG. 10 shows a front perspective view of first swing arm assembly 210 removed from base rack 120. FIG. 11 shows a front perspective view of second swing arm assembly 250 removed from base rack 120. In the embodiment of accessory rack 110 shown in FIG. 1 and FIG. 2, both first and second swing arm assembly 210 and 250 include a tire rack 220 for holding a spare tire 218 and a spare fuel tank 232. In the embodiment of accessory rack 110 shown in FIG. 3 through FIG. 5, first swing arm assembly 210 includes a tire rack 220, and second swing arm assembly 250 includes a barbecue mount 271.

First swing arm assembly 210 is removably and hingedly coupled to first hinge tube 140, see FIG. 4. First swing arm assembly 210 is removably coupled to first hinge tube 140 so that first swing arm assembly 210 can be removed and replaced with a swing arm assembly that carries different accessories than first swing arm assembly 210. This allows accessory rack 110 to be easily customized to carry different accessories. In the embodiments shown in the figures, first swing arm assembly 210 includes a tire rack 220. First swing arm assembly 210 is hingedly coupled to first hinge tube 140 so that first swing arm assembly 210 can swing out from the center of base rack 120, which allows access to the rear doors or tailgate of vehicle 102, see FIG. 2 and FIG. 3. In some embodiments, the accessories mounted to first swing arm assembly 210 are meant to be used with first swing arm assembly 210 swung out from base rack 120. FIG. 1, FIG. 3, and FIG. 4 shows first swing arm assembly 210 positioned in a first swing arm assembly stored position 215. FIG. 2 shows first swing arm assembly 210 in an open position 216, where first swing arm assembly 210 is swung away from the center portion of base rack 120.

First swing arm assembly 210 includes a first swing rod 211, best seen in FIG. 4 and FIG. 10. First swing rod 211 is an elongate rod or bar of rigid material, metal in this embodiment. First swing rod 211 has a first swing rod first end 212 and a first swing rod second end 213 opposing first swing rod first end 212. First swing rod 211 has a first swing rod longitudinal axis 214 that extends from first swing rod first end 212 to first swing rod second end 213. First swing rod first end 212 is removably and hingedly coupled to first hinge tube first end 141 of first hinge tube 140, see FIG. 4. First swing rod first end 212 is coupled to a hinge 208, see FIG. 10. Hinge 208 is rotatably coupled to first hinge tube 140 such that hinge 208 and first swing rod 211 can rotate in first hinge tube 140. Hinge 208 has a hinge rod 206 (FIG. 10) that slides into and out of first hinge tube 140 to removably and rotatably couple first swing rod 211 to first hinge tube 140.

First swing rod assembly 210 includes two accessory support rods 221 and 222. Accessory support rods 221 and 222 are used to support accessories or other support structure that carries accessories. Accessory support rods as described in this document are labeled using "first", "second", "third", etc. but these numbering labels are for ease of discussion only and are interchangeable and not mean to designate order or priority. First swing rod assembly 210 includes first accessory support rod 221 and second accessory support rod 222. First accessory support rod 221 and second accessory support rod 222 are both straight elongate bars or rods of rigid material. First accessory support rod 221 and second accessory support rod 222 are hollow metal tubes in the embodiment shown in the figures. First accessory support rod 221 is coupled to first swing rod 211 at one end of first accessory support rod 221. Second accessory support rod 222 is coupled to first swing rod 211 at one end of second accessory support rod 221. First and second accessory support rods 221 and 222 lie in a support rod plane 223, see FIG. 10. Support rod plane 223 is perpendicular to base rack plane 121 in this embodiment.

First swing arm assembly 210 includes a tire rack 220 (FIG. 10) that includes a tire holder bar 224. Tire holder bar 224 is a bent bar or rod of rigid material, hollow metal tube in this embodiment, that is used to couple a tire to. Tire holder bar 224 has a tire holder bar first end 226 coupled to first swing rod 211. Tire holder bar 224 has a tire holder bar second end 227 that is also coupled to first swing rod 211. Tire holder bar 224 has a tire holder bar bend 228 between tire holder bar first end 226 and tire holder bar second end 227. Tire holder bar bend 228 has a tire holder bar bend angle 229 of between about 35 and about 40 degrees. In the embodiment shown, tire holder bar bend angle 229 has an angular value of about 37.5 degrees. In some embodiments, tire holder bar bend angle is between about 30 to about 45 degrees. These angular values provide a tire holder bar with enough width and stability to hold a spare tire 218, with either end of tire holder bar 224 able to couple to first swing rod 211.

Tire rack 220 of first swing arm assembly 210 holds a spare tire 218, as shown in FIG. 1 through FIG. 3. Spare tire 218 sits on first and second accessory support rods 221 and 222 and is secured to tire holder bar 224.

Tire rack 220 of first swing arm assembly 210 also includes a fuel tank coupler 230, see FIG. 10. Fuel tank coupler 230 is a flat bar of rigid material with holes in it for coupling spare fuel tank 232 to. Fuel tank coupler 230 is coupled to tire holder bar 224 at tire holder bar bend 228, as shown in FIG. 10. Fuel tank coupler 230 is coupled to tire holder bar 224 at tire holder bar bend 228 with a longitudinal axis of fuel tank coupler 230 perpendicular to first swing rod longitudinal axis 214. A spare fuel tank 232 is coupled to fuel tank coupler 230, as shown in FIG. 2.

Tire rack 220 of first swing arm assembly 210 also includes a hammock mount 294. Hammock mount 294 is coupled to tire holder bar 224, as shown in FIG. 4 and FIG. 10. Hammock mount 294 is a vertically-mounted hollow tube of rigid material with a longitudinal axis that is perpendicular to first swing rod 214. A hammock tube that couples to one end of a hammock is slid into hammock mount 294 to hold one end of the hammock for use.

Second swing arm assembly 250 is removably and hingedly coupled to second hinge tube 150, see FIG. 4. Second swing arm assembly 250 is removably coupled to second hinge tube 150 so that second swing arm assembly 250 can be removed and replaced with a swing arm assembly that carries different accessories than second swing arm assembly 250. This allows accessory rack 110 to be easily customized to carry different accessories. In the embodiments shown in FIG. 3 through FIG. 5, and FIG. 11, second swing arm assembly 250 includes a barbecue rack 271, best seen in FIG. 4 and FIG. 11. FIG. 11 shows a front view of second swing arm assembly 250 and barbecue rack 271. Second swing arm assembly 250 is hingedly coupled to second hinge tube 150 so that second swing arm assembly 250 can swing out from the center of base rack 120, which allows access to the rear doors or tailgate of vehicle 102, see FIG. 2 and FIG. 3. In some embodiments, the accessories mounted to second swing arm assembly 250 are meant to be used with second swing arm assembly 250 swung out from base rack 120, as shown for barbecue rack 271 in FIG. 3. FIG. 3 shows second swing arm assembly 250 positioned in an open position 216, with second swing arm assembly 250 swung away from the center portion of base rack 120.

Second swing arm assembly 250 includes a second swing rod 251, best seen in FIG. 4 and FIG. 11. Second swing rod 251 has a second swing rod first end 252 and a second swing rod second end 253 opposing second swing rod first end 252. Second swing rod 251 has a second swing rod longitudinal axis 254 that extends from second swing rod first end 252 to second swing rod second end 253. Second swing rod first end 252 is removably and hingedly coupled to second hinge tube first end 151 of second hinge tube 150. Second swing rod first end 252 is coupled to a hinge 209, see FIG. 11. Hinge 209 is rotatably coupled to second hinge tube 150 such that hinge 209 and second swing rod 251 can rotate in second hinge tube 150. Hinge 209 has a hinge rod 207 (FIG. 11) that slides into and out of second hinge tube 150 to removably and rotatably couple second swing rod 251 to second hinge tube 150.

Second swing arm assembly 250 includes two accessory support rods 260 and 280. Accessory support rods 260 and 280 are used to support accessories or other support structure that carries accessories. Second swing rod assembly 250 includes third accessory support rod 260 and fourth accessory support rod 280, see FIG. 11. Third accessory support rod 260 and fourth accessory support rod 280 are both straight elongate bars or rods of rigid material. Third accessory support rod 260 and fourth accessory support rod 280 are hollow metal tubes in the embodiment shown in the figures. Third accessory support rod 260 is coupled to second swing rod 251 at one end of third accessory support rod 260. Fourth accessory support rod 280 is coupled to second swing rod 251 at one end of fourth accessory support rod 280. Third and fourth accessory support rods 260 and 280 lie in a second support rod plane 259, see FIG. 11. Second support rod plane 259 is perpendicular to base rack plane 121 in this embodiment.

Second swing arm assembly 251 includes barbecue rack 271 as shown in FIG. 11. Barbecue rack 271 includes third and fourth accessory support rods 260 and 280 and four angle brackets 266, 268, 286, and 288. Third and fourth accessory support rods 260 and 280 and four angle brackets 266, 268, 286, and 288 are used to support barbecue 270, see FIG. 3. In some embodiments, second swing arm assembly 250 includes an upright rod 236 and a first and a second cross-support rod 240 and 244, as shown in FIG. 11. Upright rod 236 and first and a second cross-support rod 240 and 244 can be used to support one end of a hammock, or other accessories.

Second swing arm assembly 250 includes third accessory support rod 260, see FIG. 4 and FIG. 11. Third accessory support rod 260 has a third support rod first end 261 coupled to second swing rod 251, and a third support rod second end 262 opposing third support rod first end 261. Third accessory support rod 260 has a third support rod longitudinal axis 263 that is perpendicular to base rack plane 121 and second swing rod longitudinal axis 254.

First, second, third, and fourth angle brackets 266, 268, 286, and 288 are each elongate L brackets formed of rigid material, metal in this embodiment. First, second, third, and fourth angle brackets 266, 268, 286, and 288 are coupled to, and used to support and hold, barbecue 270 in this embodiment, see FIG. 3.

First angle bracket 266 is coupled to third support rod first end 261, see FIG. 11. First angle bracket 266 has a first angle bracket longitudinal axis 267 that is perpendicular to third support rod longitudinal axis 263. Second angle bracket 268 is coupled to third support rod second end 262. Second angle bracket 268 has a second angle bracket longitudinal axis 269 that is perpendicular to third support rod longitudinal axis 263, see FIG. 11.

Second swing arm assembly 250 includes fourth accessory support rod 280, see FIG. 4 and FIG. 11. Fourth accessory support rod 280 has a fourth support rod first end 281 coupled to second swing rod 251, and a fourth support rod second end 282 opposing fourth support rod first end 281. Fourth accessory support rod 280 has a fourth support rod longitudinal axis 283 that is perpendicular to base rack plane 121 and second swing rod longitudinal axis 254.

Third angle bracket 286 is coupled to fourth support rod first end 281, see FIG. 11. Third angle bracket 286 has a third angle bracket longitudinal axis 287 that is perpendicular to fourth support rod longitudinal axis 283. Fourth angle bracket 288 is coupled to fourth support rod second end 282. Fourth angle bracket 288 has a fourth angle bracket longitudinal axis 289 that is perpendicular to fourth support rod longitudinal axis 283, see FIG. 11.

Barbecue 270 sits on, and is coupled to, first, second, third, and fourth angle brackets 266, 268, 286, and 288, as shown in FIG. 3. Barbecue 270 is used by swinging out second swing arm assembly 250 into open position 216, see FIG. 3.

Upright rod 236, first cross-support rod 240 and second cross-support rod 244 are used in some embodiments of second swing arm assembly 250 to hold additional accessories or support one end of a hammock. Upright rod 236, first cross-support rod 240 and second cross-support rod 244 are each elongate rods or bars of rigid material, hollow metal tubes in this embodiment.

Upright rod 236 has an upright rod first end 237 and an upright rod second end 238 opposing upright rod first end 237. Upright rod first end 237 is coupled to second swing rod 251 between third accessory support rod 260 and fourth accessory support rod 280. Upright rod 236 has an upright rod longitudinal axis 239 that is parallel to base rack plane 121 and perpendicular to each of second swing rod longitudinal axis 254, and third and fourth support rod longitudinal axes 263 and 283.

First cross-support rod 240 couples at either end to second swing rod 251 and upright rod 236 to provide strength and stability to upright rod 236. First cross-support rod 240 has a first cross-support rod first end 241 coupled to second swing rod 251, and a first cross-support rod second end 242 coupled to upright rod 236. In the embodiment shown in the figures, first cross-support rod 240 forms a first cross-support rod angle 243 between first cross-support rod 240 and second swing rod 251. First cross-support rod angle 243 can have a value between about 5 and about 45 degrees, depending on the length of upright rod 236. In some embodiments first cross-support rod angle 243 has a value between about 10 and about 30 degrees.

Second cross-support rod 244 couples at either end to second swing rod 251 and upright rod 236 to provide strength and stability to upright rod 236. Second cross-support rod 244 has a second cross-support rod first end 245 coupled to second swing rod 251, and a second cross-support rod second end 246 coupled to upright rod 236. In the embodiment shown in the figures, second cross-support rod 244 forms a second cross-support rod angle 247 between second cross-support rod 244 and second swing rod 251. Second cross-support rod angle 247 can have a value between about 5 and about 45 degrees, depending on the length of upright rod 236. In some embodiments second cross-support rod angle 247 has a value between about 10 and about 30 degrees.

Upright rod 236 can be a hammock mount or a mount for other accessories. A hammock tube coupled to one end of a hammock can be inserted into upright rod 236 to mount one end of the hammock for use.

Accessory rack 110 includes two locking pins, a first locking pin 190 and a second locking pin 195, that are used to lock first and second swing arm assemblies 210 and 250 in stored positions 215 and 255, see FIG. 4, FIG. 7, and FIG. 9. When first swing arm assembly 210 is in first swing arm assembly stored position 215, as shown in FIG. 4, first swing rod 211 is parallel to and adjacent upper support rod 130. When second swing arm assembly 250 is in second swing arm assembly stored position 255, as shown in FIG. 4, second swing rod 251 is parallel to and adjacent upper support rod 130. First and second locking pins 190 and 195 are spring loaded. First and second locking pins 190 and 195 are coupled to, and extend through, upper support rod 130, best seen in FIG. 7 and FIG. 9. First and second locking pins 190 and 195 reciprocatably extend into either first or second swing rod 211 or 251 to lock first or second swing rod 211 or 251 in stored position 215 or 255. FIG. 4 shows first and second swing arm assemblies 210 and 250 in stored positions 215 and 255, with first locking pin 190 locking first swing rod 211 in first swing arm assembly stored position 215, and second locking pin 195 locking second swing rod 251 in second swing arm assembly stored position 255.

FIG. 7 and FIG. 9 show first and second locking pins 190 and 195 extending from upper support rod 130. FIG. 12 shows a partial cutaway of locking pin 190. Locking pin 195 is identical to locking pin 190, except locking pin 195 is used on second swing arm assembly 250 instead of first swing arm assembly 210. FIG. 13 shows a close-up view of locking pin 190 extending through upper support rod 130 and into first swing rod 211 to lock first swing rod 211 in first swing arm assembly stored position 215 as shown in FIG. 4.

First locking pin 190 includes a locking pin inner shaft 191, an outer sleeve 189, and a spring 199. Locking pin inner shaft 191 is a round straight bar or rod of rigid material, metal in this embodiment. Locking pin inner shaft 191 has an inner shaft first end 193 and an inner shaft second end 194 opposing inner shaft first end 193. Locking pin inner shaft 191 has a T-handle 192 coupled to inner shaft first end 193. Locking pin inner shaft 191 has a threaded section 198 at inner shaft second end 194. Threaded section 198 is threads cut into inner shaft second end 194. Spring 199 is slid over, and couples to, locking pin inner shaft 191, see FIG. 12.

Outer sleeve 189 is a hollow tube of rigid material, metal in this embodiment. Outer sleeve 189 has an outer sleeve first end 186 and an outer sleeve second end 187. A flange 185 is coupled to outer spring first end 186.

Locking pin inner shaft 191 and spring 199 are positioned inside outer sleeve 189, with outer sleeve 189 slidingly coupled to locking pin inner shaft 191. Spring 199 biases locking pin inner shaft 191 with T-handle 192 against flange 185 at outer sleeve first end 186 and with inner shaft second end 194 and threaded section 198 maximally extended out outer sleeve second end 187.

Outer sleeve 189 is extended through and coupled to upper support rod 130, which couples first locking pin 190 to upper support rod 130. Inner shaft 191 slides in outer sleeve 189, biased by spring 199. When first swing rod 211 is in first swing arm assembly stored position 215, with first swing rod 211 adjacent and parallel to upper support rod 130, inner shaft second end 194, and threaded section 198, reciprocatably extend into and out of a threaded hole in first swing rod 211, see FIG. 13. Spring 199 biases inner shaft second end 194 into first swing rod 211. Threading threaded section 198 into the threaded hole in first swing rod 211 couples first swing rod 211 to upper support rod 130 in first swing arm assembly stored position 215, see FIG. 4 and FIG. 13. With first swing rod 211 locked to upper support rod 130 in first swing arm assembly stored position 215, first swing arm assembly 210 is locked in a position for vehicle 102 to travel, as shown in FIG. 1 and FIG. 3. In order to access the rear of vehicle 102, or to access spare tire 218 or spare fuel tank 232, inner shaft second end 194 and threaded section 198 are unthreaded from first swing rod 211, and locking pin inner shaft 191 is pulled out of first swing rod 211 using T-handle 192. This releases first swing rod 211 from first swing arm assembly stored position 215 and allows first swing rod to swing out to open position 216 as shown in FIG. 2.

Second locking pin 195 is the same as first locking pin 190, with the same description, except second locking pin 195 reciprocatably extends into and out of second swing rod 251 to lock second swing rod 251 in second swing arm assembly stored position 255, see FIG. 4. With first and second swing rods 211 and 251 locked in stored positions 215 and 255, vehicle 102 can travel down the road.

Figure 14:
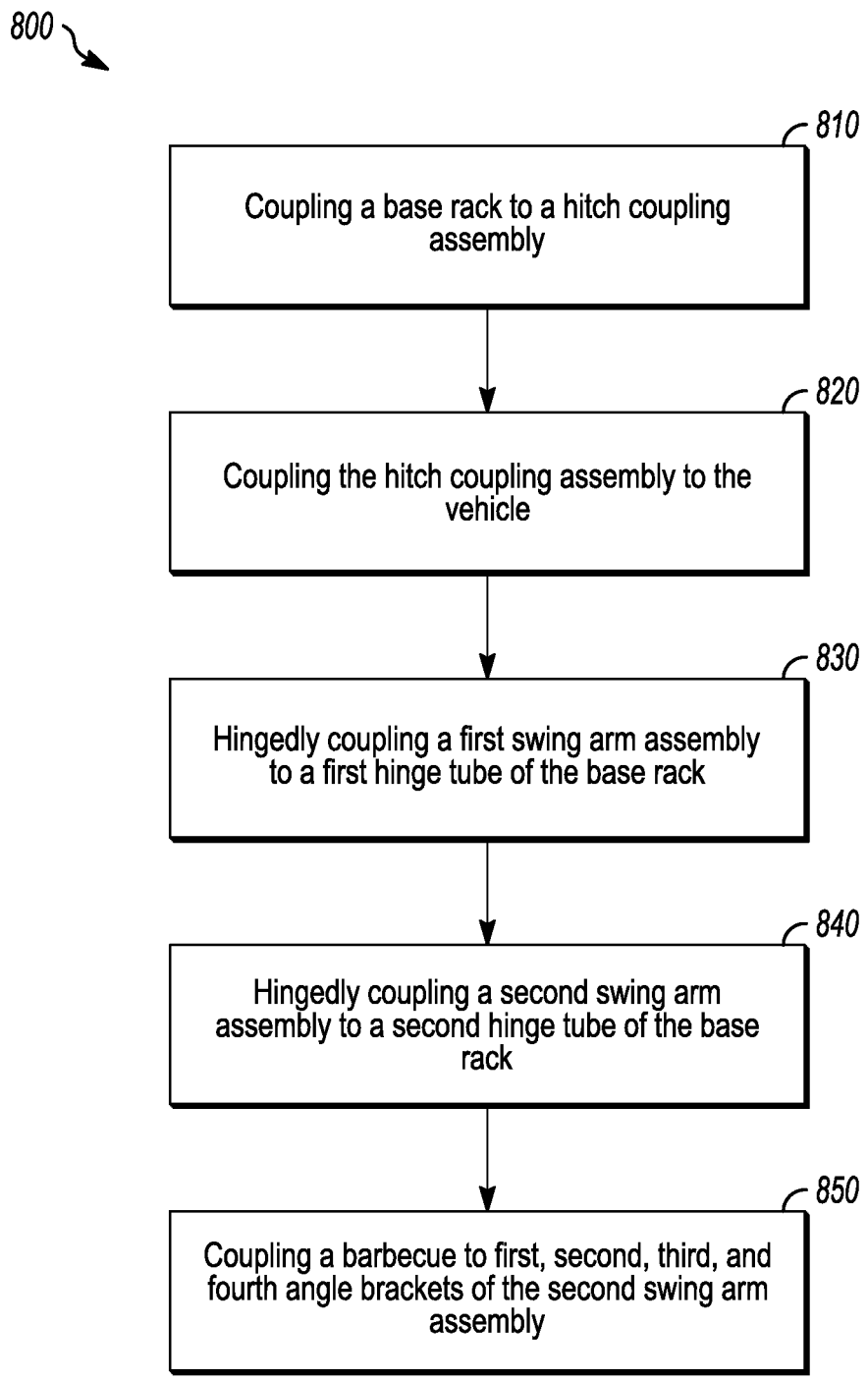
FIG. 14 illustrates a method of coupling a barbecue to a vehicle.

FIG. 14 illustrates a method 800 of coupling a barbecue to a vehicle. Method 800 includes an act 810 coupling a base rack to a hitch coupling assembly. The base rack includes an upper support rod, a first and a second hinge tube, and a first and a second lower support rod. The upper support rod has an upper rod first end, an upper rod second end and an upper rod longitudinal axis. The upper rod longitudinal axis is parallel to a bumper longitudinal axis of the vehicle. The first hinge tube is coupled to the upper rod first end. The second hinge tube is coupled to the upper rod second end. The first lower support rod extends between the first hinge tube and the hitch coupling assembly. The second lower support rod extending between the second hinge tube and the hitch coupling assembly.

Method 800 includes an act 820 of coupling the hitch coupling assembly to the vehicle. The hitch coupling assembly is coupled to a hitch receiver of the vehicle to couple the hitch coupling assembly to the vehicle. The hitch coupling assembly includes a receiver tube, a receiver wedge tube, and a tightening bolt. The receiver tube is an elongate hollow tube with a rounded rectangular shaped transverse cross-section. The receiver wedge tube is a hollow tube with a rounded rectangular shaped transverse cross section. The tightening bolt and a nut couples the receiver wedge tube to the receiver tube. Coupling the hitch coupling assembly to the vehicle includes using the tightening bolt to couple the receiver wedge assembly to the receiver tube, and then inserting the receiver wedge assembly, receiver tube, and tightening bolt into the hitch receiver of the vehicle. In some embodiments the hitch coupling assembly further includes an accessory trailer hitch receiver coupled to the receiver tube. When the accessory trailer hitch is coupled to the receiver tube, the vehicle can pull a trailer by coupling a trailer to the accessory trailer hitch receiver.

Method 800 includes an act 830 of hingedly coupling a first swing arm assembly to the first hinge tube. The first swing arm assembly includes a first swing rod. A first swing rod first end of the first swing rod is removably and rotatably coupled to the first hinge tube.

Method 800 includes an act 840 of hingedly coupling a second swing arm assembly to the second hinge tube. The second swing arm assembly includes a second swing rod, a first accessory support rod, a second accessory support rod, and four angle brackets. The second swing rod has a second swing rod first end that is removably and rotatably coupled to the second hinge tube, a second swing rod second end opposing the second swing rod first end, and a second swing rod longitudinal axis. The first accessory support rod is coupled to the second swing rod. The first accessory support rod has a first support rod first end coupled to the second swing rod, a first support rod second end opposing the first support rod first end, and a first support rod longitudinal axis. The first support rod longitudinal axis is perpendicular to the second swing rod longitudinal axis. The second accessory support rod is coupled to the second swing rod. The second accessory support rod has a second support rod first end coupled to the second swing rod, a second support rod second end opposing the second support rod first end, and a second support rod longitudinal axis. The second support rod longitudinal axis is perpendicular to the second swing rod longitudinal axis.

A first angle bracket of the four angle brackets is coupled to the first support rod first end. The first angle bracket has a first angle bracket longitudinal axis that is perpendicular to the first support rod longitudinal axis. A second angle bracket of the four angle brackets is coupled to the first support rod second end. The second angle bracket has a second angle bracket longitudinal axis perpendicular to the first support rod longitudinal axis. A third angle bracket of the four angle brackets is coupled to the second support rod first end. The third angle bracket has a third angle bracket longitudinal axis perpendicular to the second support rod longitudinal axis. A fourth angle bracket of the four angle brackets is coupled to the second support rod second end. The fourth angle bracket has a fourth angle bracket longitudinal axis perpendicular to the second support rod longitudinal axis.

Method 800 also includes an act 850 of coupling a barbecue to the first, second, third and fourth angle bracket. With the barbecue coupled to the four angle brackets, the barbecue is coupled to the vehicle and can be carried and used with the vehicle.

Method 800 can include many other acts. In some embodiments, method 800 includes coupling a tire holder bar and a tire to the first swing rod. In some embodiments, method 800 includes coupling a first hammock mount that includes a first hollow tube to the first swing arm assembly. In some embodiments method 800 includes coupling a second hammock mount that includes a second hollow tube to the second swing arm assembly. The hammock mounts can be used to mount a hammock to.

In some embodiments, method 800 includes extending a first locking pin through the upper support rod into the first swing rod, and threading the first locking pin into the first swing rod to lock the first swing arm assembly in a first swing arm assembly stored position. In some embodiments, method 800 includes extending a second locking pin through the upper support rod into the second swing rod, and threading the second locking pin into the second swing rod to lock the second swing arm assembly in a second swing arm assembly stored position.

An accessory rack for a vehicle has been shown and described. The accessory rack couples to the hitch receiver of a vehicle to couple the accessory rack to the vehicle. The accessory rack holds and carries accessories. The accessory rack includes a base rack, a hitch coupling assembly, a first swing arm assembly and a second swing arm assembly. The first and second swing arm assemblies are hingedly and removably coupled to the base rack. The first and second swing arm assemblies swing out from the center of the base rack using hinges at the outer ends of the base rack. The first and the second swing arm assemblies carry accessory racks such as a tire rack that carries a spare tire and a spare fuel tank, or a barbecue mount that carries a barbecue, for example but not by way of limitation. The first and second swing arm assemblies are removably coupled to the base rack so the swing arms can be removed and replaced with another swing arm assembly according to what accessories it is desired to carry on the vehicle. The base rack is coupled to the hitch coupling assembly. The hitch coupling assembly couples the base rack and the first and second swing arm assemblies to the hitch receiver of the vehicle.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. An accessory rack for a vehicle, the accessory rack comprising:
 a base rack comprising:
  an upper support rod having an upper rod first end, an upper rod second end and an upper rod longitudinal axis;
  a first hinge tube coupled to the upper rod first end, wherein the first hinge tube has a first hinge tube first end, a first hinge tube second end, and a first hinge tube longitudinal axis, and wherein the upper rod longitudinal axis is perpendicular to the first hinge tube longitudinal axis;
  a second hinge tube coupled to the upper rod second end, wherein the second hinge tube has a second hinge tube first end, a second hinge tube second end, and a second hinge tube longitudinal axis, and wherein the upper rod longitudinal axis is perpendicular to the second hinge tube longitudinal axis;
  a first lower support rod having a first lower rod first end, a first lower rod second end, and a first lower rod bend, wherein the first lower rod first end is coupled to the first hinge tube a first end distance away from the upper rod first end, wherein the first end distance is between about 0.1 inches and about 2 inches;
  a second lower support rod having a second lower rod first end, a second lower rod second end, and a second lower rod bend, wherein the second lower rod first end is coupled to the second hinge tube a second end distance away from the upper rod second end, wherein the second end distance is between about 0.1 inches and about 2 inches;
 a hitch coupling assembly comprising a receiver tube having a receiver tube longitudinal axis, wherein the receiver tube is coupled to the first lower rod second end and the second lower rod second end, and wherein the receiver tube longitudinal axis is perpendicular to the upper rod longitudinal axis and spaced apart from the upper rod longitudinal axis by a hitch distance of about 6 inches to about 10 inches;
 a first swing arm assembly removably and rotatably coupled to the first hinge tube; and
 a second swing arm assembly removably and rotatably coupled to the second hinge tube.

2. The accessory rack of claim 1, wherein the first lower support rod further comprises:
 a first lower rod angle section extending from the first lower rod first end to the first lower rod bend having a first lower rod angle section longitudinal axis, wherein a first lower rod angle between the first lower rod angle section longitudinal axis and the first hinge tube longitudinal axis is about 73 degrees;
 a first lower rod parallel section extending from the first lower rod bend to the first lower rod second end having a first lower rod parallel section longitudinal axis;
 a first lower rod inner angle between the first lower rod angle section and the first lower rod parallel section, wherein the first lower rod inner angle is between about 160 degrees and about 168 degrees;
 and wherein the second lower support rod further comprises:
 a second lower rod angle section extending from the second lower rod first end to the second lower rod bend having a second lower rod angle section longitudinal axis, wherein a second lower rod angle between the second lower rod angle section longitudinal axis and the second hinge tube longitudinal axis is about 73 degrees;
 a second lower rod parallel section extending from the second lower rod bend to the second lower rod second end having a second lower rod parallel section longitudinal axis;
 a second lower rod inner angle between the second lower rod angle section and the second lower rod parallel section, wherein the second lower rod inner angle is between about 160 degrees and about 168 degrees.

3. The accessory rack of claim 1, wherein the hitch coupling assembly further comprises:
 a receiver wedge element removably coupled to the receiver tube; and
 an accessory hitch receiver coupled to the receiver tube.

4. The accessory rack of claim 2, wherein the upper rod longitudinal axis, the first and second hinge tube longitudinal axes, the first and second lower rod angle section longitudinal axes, and the first and second lower rod parallel section longitudinal axes all lie in a base rack plane, and wherein the receiver tube longitudinal axis is perpendicular to the base rack plane.

5. The accessory rack of claim 1, wherein the first swing arm assembly comprises a first swing rod having a first swing rod first end, a first swing rod second end opposing the first swing rod first end, and a first swing arm longitudinal axis, wherein the first swing rod first end is removably and hingedly coupled to the first hinge tube first end; and wherein the second swing arm assembly comprises a second swing rod having a second swing rod first end, a second swing rod second end opposing the second swing rod first end, and a second swing rod longitudinal axis, wherein the second swing rod first end is removably and hingedly coupled to the second hinge tube first end.

6. The accessory rack of claim 5, further comprising:
 a first locking pin, wherein the first locking pin is spring loaded, is coupled to and extends through the upper support rod, and reciprocatably extends into the first swing rod to lock the first swing arm assembly in a first swing arm assembly stored position; and
 a second locking pin, wherein the second locking pin is spring loaded, is coupled to and extends through the upper support rod, and reciprocatably extends into the second swing rod to lock the second swing arm assembly in a second swing arm assembly stored position.

7. The accessory rack of claim 5, wherein the first swing arm assembly further comprises:
 a first accessory support rod coupled to the first swing rod;
 a second accessory support rod coupled to the first swing rod, wherein the first and the second accessory support rods lie in a support rod plane, wherein the support rod plane is perpendicular to the base rack plane;
 a tire holder bar coupled to the first swing rod, wherein the tire holder bar defines a tire holder bar plane that is perpendicular to the support rod plane;
 and
 a fuel tank coupler coupled to the tire holder bar.

8. The accessory rack of claim 7, wherein the tire holder bar comprises:
- a tire holder bar first end coupled to the first swing rod;
- a tire holder bar second end coupled to the first swing rod;
- a tire holder bar bend in the tire holder bar, wherein the tire holder bar bend is between the tire holder bar first end and the tire holder bar second end, and wherein the tire holder bar bend has a tire holder bar bend angle of between about 35 degrees and about 40 degrees; and
- a hammock mount coupled to the tire holder bar, wherein the hammock mount is a hollow tube.

9. The accessory rack of claim 8, wherein the second swing arm assembly comprises:
- a third support rod coupled to the second swing rod, wherein the third support rod has a third support rod first end coupled to the second swing rod, a third support rod second end opposing the third support rod first end, and a third support rod longitudinal axis, wherein the third support rod longitudinal axis is perpendicular to the base rack plane;
- a first angle bracket coupled to the third support rod first end, wherein the first angle bracket has a first angle bracket longitudinal axis perpendicular to the third support rod longitudinal axis;
- a second angle bracket coupled to the third support rod second end, wherein the second angle bracket has a second angle bracket longitudinal axis perpendicular to the third support rod longitudinal axis;
- a fourth support rod coupled to the second swing rod, wherein the fourth support rod has a fourth support rod first end coupled to the second swing rod, a fourth support rod second end opposing the fourth support rod first end, and a fourth support rod longitudinal axis, wherein the fourth support rod longitudinal axis is perpendicular to the base rack plane;
- a third angle bracket coupled to the fourth support rod first end, wherein the third angle bracket has a third angle bracket longitudinal axis perpendicular to the fourth support rod longitudinal axis;
- a fourth angle bracket coupled to the fourth support rod second end, wherein the fourth angle bracket has a fourth angle bracket longitudinal axis perpendicular to the fourth support rod longitudinal axis.

10. The accessory rack of claim 9, wherein a barbecue is coupled to the first, second, third, and fourth angle brackets.

11. The accessory rack of claim 10, wherein the second swing arm assembly further comprises:
- an upright rod coupled to the second swing rod between the third and the fourth support rod, wherein the upright rod has an upright rod first end coupled to the second swing rod, an upright rod second end opposing the upright rod first end, and an upright rod longitudinal axis, wherein the upright rod longitudinal axis is parallel to the base rack plane;
- a first cross-support rod having a first cross-support rod first end coupled to the second swing rod, and a first cross-support rod second end coupled to the upright rod, wherein the first cross-support rod forms a first cross-support rod angle between the first cross-support rod and the second swing rod of between about 10 degrees and about 30 degrees; and
- a second cross-support rod having a second cross-support rod first end coupled to the second swing rod, and a second cross-support rod second end coupled to the upright rod, wherein the second cross-support rod forms a second cross-support rod angle between the second cross-support rod and the second swing rod of between about 10 degrees and about 30 degrees.

12. A vehicle having an accessory rack coupled to the vehicle, the vehicle comprising:
- a bumper, wherein the bumper has a bumper longitudinal axis;
- a hitch receiver; and
- the accessory rack coupled to the vehicle, wherein the accessory rack comprises:
  - a hitch coupling assembly, wherein the hitch coupling assembly couples to the hitch receiver; and
  - a first lower support rod coupled to and extending from the hitch coupling assembly towards a vehicle driver side, wherein the first lower support rod comprises:
    - a first lower rod first end;
    - a first lower rod second end coupled to the hitch coupling assembly;
    - a first lower rod bend between the first lower rod first end and the first lower rod second end, wherein the first lower rod bend has a first lower rod inner angle of between about 160 degrees and about 168 degrees;
  - a first hinge tube coupled to the first lower rod first end;
  - a second lower support rod coupled to and extending from the hitch coupling assembly towards a vehicle passenger side, wherein the second lower support rod comprises:
    - a second lower rod first end;
    - a second lower rod second end coupled to the hitch coupling assembly;
    - a second lower rod bend between the second lower rod first end and the second lower rod second end, wherein the second lower rod bend has a second lower rod inner angle of between about 160 degrees and about 168 degrees;
  - a second hinge tube coupled to a second lower rod first end; and
  - an upper support rod coupled to and extending between the first hinge tube and the second hinge tube, wherein the upper support rod has an upper rod longitudinal axis and wherein the upper rod longitudinal axis is parallel to the bumper longitudinal axis;
  - a first swing arm assembly removably and rotatably coupled to the first hinge tube; and
  - a second swing arm assembly removably and rotatably coupled to the second hinge tube.

13. The vehicle of claim 12, wherein the first lower support rod further comprises:
- a first lower rod angle section extending from the first lower rod first end to the first lower rod bend, wherein the first lower rod angle section has a first lower rod angle section longitudinal axis; and
- a first lower rod parallel section extending from the first lower rod bend to the first lower rod second end, wherein the first lower rod parallel section has a first lower rod parallel section longitudinal axis parallel to the bumper longitudinal axis.

14. The vehicle of claim 13, wherein the second lower support rod further comprises:
- a second lower rod angle section extending from the second lower rod first end to the second lower rod bend, wherein the second lower rod angle section has a second lower rod angle section longitudinal axis; and a second lower rod parallel section extending from the second lower rod bend to the second lower rod second end, wherein the second lower rod parallel section has a second lower rod parallel section longitudinal axis parallel to the bumper longitudinal axis.

15. The vehicle of claim 12, wherein a first upper rod angle of between about 14 degrees and about 20 degrees is formed between the first lower rod angle section longitudinal axis and the upper rod longitudinal axis.

16. A method of coupling a barbecue to a vehicle, the method comprising:
coupling a base rack to a hitch coupling assembly, wherein the base rack comprises:
an upper support rod having an upper rod first end, an upper rod second end and an upper rod longitudinal axis, wherein the upper rod longitudinal axis is parallel to a bumper longitudinal axis of the vehicle;
a first hinge tube coupled to the upper rod first end;
a second hinge tube coupled to the upper rod second end;
a first lower support rod extending between the first hinge tube and the hitch coupling assembly; and
a second lower support rod extending between the second hinge tube and the hitch coupling assembly;
coupling the hitch coupling assembly to the vehicle, wherein the hitch coupling assembly comprises:
a receiver tube, wherein the receiver tube is an elongate hollow tube with a rounded rectangular shaped transverse cross-section;
a receiver wedge tube, wherein the receiver wedge tube is a hollow tube with a rounded rectangular shaped transverse cross section;
and
a tightening bolt and a nut that couples the receiver wedge tube to the receiver tube;
hingedly coupling a first swing arm assembly to the first hinge tube, wherein the first swing arm assembly comprises a first swing rod having a first swing rod first end removably and rotatably coupled to the first hinge tube; and
hingedly coupling a second swing arm assembly to the second hinge tube, wherein the second swing arm assembly comprises:
a second swing rod having a second swing rod first end removably and rotatably coupled to the second hinge tube, a second swing rod second end opposing the second swing rod first end, and a second swing rod longitudinal axis;
a first accessory support rod coupled to the second swing rod, wherein the first accessory support rod has a first support rod first end coupled to the second swing rod, a first support rod second end opposing the first support rod first end, and a first support rod longitudinal axis, wherein the first support rod longitudinal axis is perpendicular to the second swing rod longitudinal axis;
a first angle bracket coupled to the first support rod first end, wherein the first angle bracket has a first angle bracket longitudinal axis perpendicular to the first support rod longitudinal axis;
a second angle bracket coupled to the first support rod second end, wherein the second angle bracket has a second angle bracket longitudinal axis perpendicular to the first support rod longitudinal axis;
a second accessory support rod coupled to the second swing rod, wherein the second accessory support rod has a second support rod first end coupled to the second swing rod, a second support rod second end opposing the second support rod first end, and a second support rod longitudinal axis, wherein the second support rod longitudinal axis is perpendicular to the second swing rod longitudinal axis;
a third angle bracket coupled to the second support rod first end, wherein the third angle bracket has a third angle bracket longitudinal axis perpendicular to the second support rod longitudinal axis; and
a fourth angle bracket coupled to the second support rod second end, wherein the fourth angle bracket has a fourth angle bracket longitudinal axis perpendicular to the second support rod longitudinal axis;
and
coupling a barbecue to the first, second, third and fourth angle bracket.

17. The method of claim 16, further comprising coupling a tire holder bar and a tire to the first swing rod.

18. The method of claim 16, further comprising:
extending a first locking pin through the upper support rod into the first swing rod;
threading the first locking pin into the first swing rod to lock the first swing arm assembly in a first swing arm assembly stored position;
extending a second locking pin through the upper support rod into the second swing rod;
and
threading the second locking pin into the second swing rod to lock the second swing arm assembly in a second swing arm assembly stored position.

19. The method of claim 16, wherein the hitch coupling assembly further comprises an accessory trailer hitch receiver coupled to the receiver tube.

20. The method of claim 16, further comprising:
coupling a first hammock mount comprising a first hollow tube to the first swing arm assembly; and
coupling a second hammock mount comprising a second hollow tube to the second swing arm assembly.

* * * * *